(12) United States Patent  
Tzruya et al.

(10) Patent No.: US 7,596,536 B2
(45) Date of Patent: Sep. 29, 2009

(54) SYSTEM, METHOD AND COMPUTER PROGRAM PRODUCT FOR DYNAMICALLY MEASURING PROPERTIES OF OBJECTS RENDERED AND/OR REFERENCED BY AN APPLICATION EXECUTING ON A COMPUTING DEVICE

(75) Inventors: Yoav Tzruya, Even Yehuda (IL); Itay Nave, Kfar Hess (IL)

(73) Assignee: Exent Technologies, Ltd., Petach-Tikva (IL)

( * ) Notice: Subject to any disclaimer, the term of this patent is extended or adjusted under 35 U.S.C. 154(b) by 474 days.

(21) Appl. No.: 11/472,454

(22) Filed: Jun. 22, 2006

(65) Prior Publication Data

US 2007/0129146 A1    Jun. 7, 2007

Related U.S. Application Data

(63) Continuation-in-part of application No. 11/290,830, filed on Dec. 1, 2005.

(60) Provisional application No. 60/797,669, filed on May 5, 2006.

(51) Int. Cl.
*G06N 5/02* (2006.01)

(52) U.S. Cl. ............... 706/45; 706/47; 715/200; 715/205; 715/700; 715/716; 715/738

(58) Field of Classification Search ............ 706/45–47; 715/200, 201, 205, 700, 716, 738, 744–747, 715/823; 345/619, 661
See application file for complete search history.

(56) References Cited

U.S. PATENT DOCUMENTS 5,905,492 A * 5/1999 Straub et al. ............... 715/744

(Continued)

FOREIGN PATENT DOCUMENTS

WO    9924904 A1    5/1999

(Continued)

OTHER PUBLICATIONS

Mohr, et al., "HijackGL: Reconstructing from Streams for Stylized Rendering", Association for Computing Machinery, Inc., (Jun. 3, 2002), pp. 13-20.

(Continued)

*Primary Examiner*—David R Vincent
*Assistant Examiner*—Omar F Fernandez Rivas
(74) *Attorney, Agent, or Firm*—Fiala & Weaver, PLLC

(57) ABSTRACT

A system, method and computer program product for dynamically enhancing and measuring a software application, such as a video game, executing on a computing device, without having to change and recompile the original application code. The system includes a staging environment that monitors the execution of the application and indexes items of graphical and/or audio information generated by the application into a first database. A system administrator or other entity then populates a second database by manual or automated means with one or more business rules, wherein each business rule is associated with one or more of the objects indexed in the first database. The system further includes a run-time environment that identifies items of graphics and/or audio information as they are generated by the application during run-time, uses the second database to determine if an identified item is associated with a business rule, and, responsive to a determination that an identified item is associated with a business rule, applies the business rule, measures the object and its related attributes and optionally report the data back to a $3^{rd}$ database. Also described herein is a system, method and computer program product for dynamically measuring attributes of objects rendered and/or referenced by software applications, without the need to revise the source code of such applications.

35 Claims, 18 Drawing Sheets

U.S. PATENT DOCUMENTS

| | | | |
|---|---|---|---|
| 5,991,836 | A | 11/1999 | Renda |
| 6,021,438 | A | 2/2000 | Duvvoori et al. |
| 6,036,601 | A | 3/2000 | Heckel |
| 6,163,317 | A * | 12/2000 | de Judicibus ............ 715/853 |
| 6,278,966 | B1 | 8/2001 | Howard et al. |
| 6,311,221 | B1 | 10/2001 | Raz et al. |
| 6,330,711 | B1 | 12/2001 | Knutson |
| 6,616,533 | B1 | 9/2003 | Rashkovskiy |
| 6,785,659 | B1 | 8/2004 | Landsman et al. |
| 6,868,525 | B1 * | 3/2005 | Szabo ..................... 715/738 |
| 6,907,566 | B1 | 6/2005 | McElfresh et al. |
| 7,120,619 | B2 * | 10/2006 | Drucker et al. ............ 706/45 |
| 7,246,254 | B2 * | 7/2007 | Alur et al. ................. 714/2 |
| 2002/0002568 | A1 | 1/2002 | Judson |
| 2002/0147858 | A1 | 10/2002 | Motoyama et al. |
| 2002/0154214 | A1 | 10/2002 | Scallie et al. |
| 2002/0178302 | A1 | 11/2002 | Tracey |
| 2003/0131286 | A1 | 7/2003 | Kaler et al. |
| 2003/0167202 | A1 | 9/2003 | Marks et al. |
| 2003/0208754 | A1 | 11/2003 | Sridhar et al. |
| 2004/0083133 | A1 | 4/2004 | Nicholas et al. |
| 2004/0122940 | A1 | 6/2004 | Gibson et al. |
| 2004/0133876 | A1 | 7/2004 | Sproule |
| 2004/0148221 | A1 | 7/2004 | Chu |
| 2004/0189671 | A1 | 9/2004 | Masne |
| 2004/0217987 | A1 | 11/2004 | Aran |
| 2005/0015641 | A1 * | 1/2005 | Alur et al. ................. 714/2 |
| 2005/0246174 | A1 | 11/2005 | DeGolia |
| 2006/0128469 | A1 | 6/2006 | Willis et al. |
| 2006/0143675 | A1 | 6/2006 | Willis et al. |
| 2007/0006190 | A1 | 1/2007 | Surasinghe |
| 2007/0061201 | A1 | 3/2007 | Ellis et al. |
| 2007/0072676 | A1 | 3/2007 | Baluja |
| 2007/0126749 | A1 | 6/2007 | Tzruya et al. |
| 2007/0129990 | A1 | 6/2007 | Tzruya |
| 2007/0130292 | A1 | 6/2007 | Tzruya et al. |
| 2007/0168309 | A1 | 7/2007 | Tzruya et al. |
| 2007/0296718 | A1 | 12/2007 | Tzruya et al. |

FOREIGN PATENT DOCUMENTS

| | | |
|---|---|---|
| WO | 0029964 A1 | 5/2000 |
| WO | 2005096782 A2 | 10/2005 |
| WO | 2007063422 A3 | 6/2007 |
| WO | 2007148233 A2 | 12/2007 |
| WO | 2007148233 A3 | 12/2007 |
| WO | 2008020313 A2 | 2/2008 |
| WO | 2008020313 A3 | 2/2008 |
| WO | 2008020317 A2 | 2/2008 |
| WO | 2008020317 A3 | 2/2008 |
| WO | 2008104834 A2 | 9/2008 |

OTHER PUBLICATIONS

Walders, H, "glAnalyze—The Newest OpenGL Product", http://www.3dsite.com/n/sites/3dsite/newsletter/issues/10/sec12.html, retrieved Apr. 15, 2002, (Apr. 29, 1999), pp. 1-3.

"New In-Game Advertising Solution from Exent Technologies Provides Dramatic Increase in Ad Inventory Without Technical Integration", http://www.exent.com/news/pr/20060427.asp, retrieved Mar. 14, 2008, (Apr. 27, 2006), pp. 1-2.

"Exent Technologies: In-Game Advertising", http://web.archive.org/web/20060504072829/http://exent.com/products_and_services/In_Game_Advertising.asp, retrieved Mar. 14, 2008, (May 4, 2006), 1 page.

Chalil, M. et al., "MPEG-4 Based Framework for Game Engine to Handle Virtual Advertisements in Games", International Conference on Multimedia and Expo, (Jul. 6, 2003), 413-416.

* cited by examiner

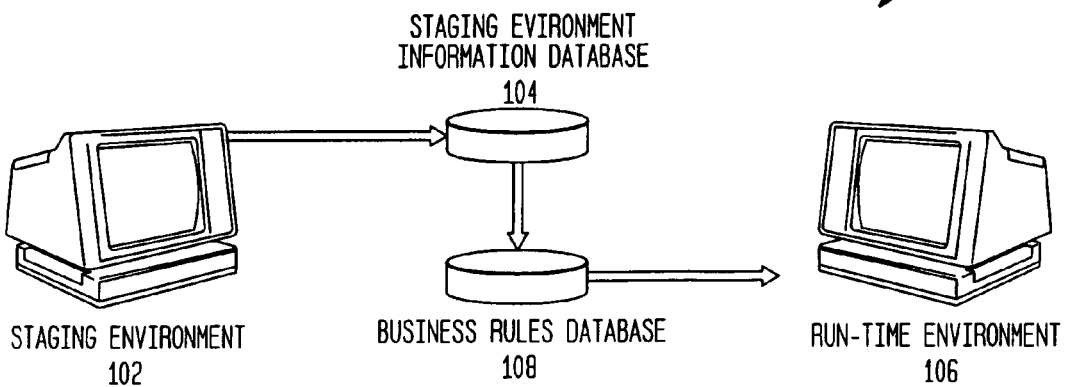
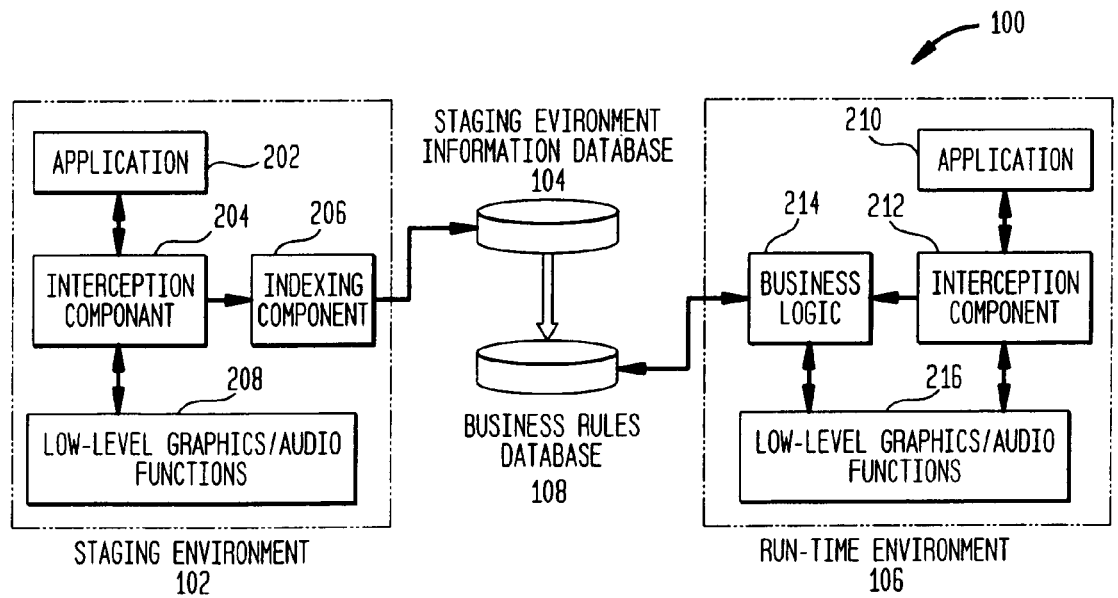

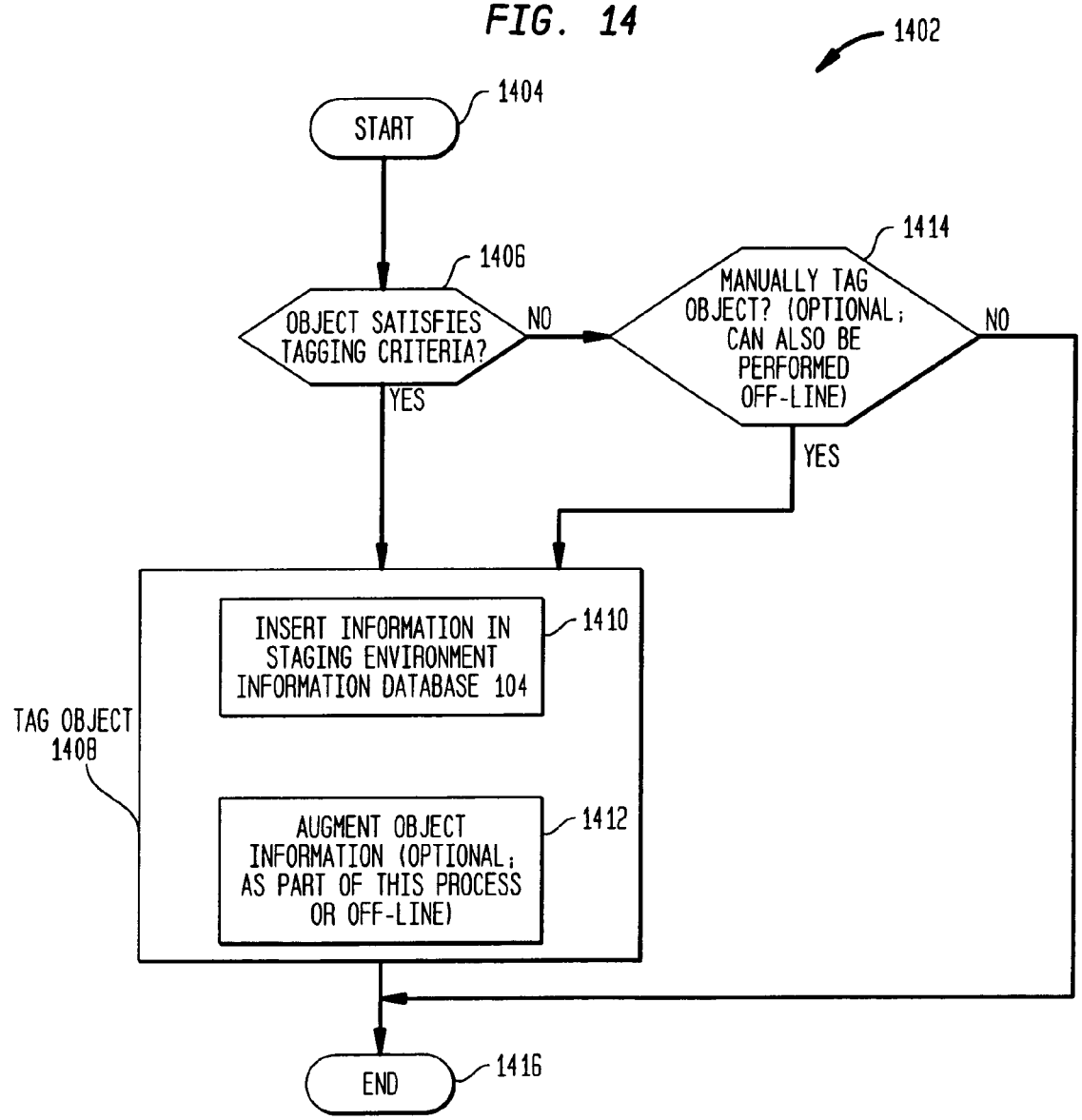

SYSTEM, METHOD AND COMPUTER PROGRAM PRODUCT FOR DYNAMICALLY MEASURING PROPERTIES OF OBJECTS RENDERED AND/OR REFERENCED BY AN APPLICATION EXECUTING ON A COMPUTING DEVICE

CROSS-REFERENCE TO RELATED APPLICATIONS

The present application claims the benefit of U.S. Provisional Patent Application No. 60/797,669 filed on May 5, 2006, which is incorporated herein by reference, and is a continuation-in-part of U.S. Non-Provisional patent application Ser. No. 11/290,830 filed on Dec. 1, 2005, which is incorporated herein by reference.

BACKGROUND OF THE INVENTION

1. Field of the Invention

The present invention generally relates to software applications. In particular, the present invention relates to techniques for dynamically enhancing software applications during execution on a computing device, and for dynamically measuring attributes of objects rendered and/or referenced by such software applications.

2. Background Art

Software applications, and video games in particular, render graphics information to a display device using a variety of techniques. One well-known technique is to place function calls to a low-level application programming interface (API) such as DirectX® or OpenGL®. In response to receiving such function calls, these APIs issue commands to the graphics hardware of a computer system or, in the alternative, attempt to emulate relevant hardware functionality in software. Similarly, software applications may play audio information by placing function calls to DirectSound®, which is an API within the DirectX® suite of APIs.

It is of interest to various parties that make such applications available to end-users (for example, publishers, retailers and service providers) to augment some of the graphics and audio information rendered by these applications based on a dynamic set of "business rules". For example, such business rules could be used to display advertising content on a graphics element rendered by a video game or to insert advertising content within an audio stream played by the video game. Ideally, the dynamic nature of the business rules would allow them to be periodically changed. For example, it would be advantageous if the inserted advertising content could be changed on a periodic basis.

One possible method of achieving this is to embed the business rules directly in the original application logic, or "source code", and then to recompile the application with those business rules. However, this technique of coding and recompiling an application to accommodate the business rules might not be achievable for all software applications. By way of example, the party wishing to insert the business rule might not have access to the source code. As another example, the application that is sought to be enhanced may already have been deployed in the field or purchased by consumers or others.

Another method of achieving the dynamic insertion of graphics content into an application is to integrate special client software into the original application logic during the software development phase of the application. When the application is executed, the special client software serves the application to communicate with a server, which, based upon some predefined business rules, may dynamically insert graphics content into the application in a pre-allocated space that has been identified and registered in advance by the application. However, this method is limiting because it will only work if the application as originally programmed includes the necessary special client software, interfaced during development time, and has identified in advance the areas and/or objects on which the dynamically-inserted graphics information may appear.

It is also of interest to various parties to track and determine the impact of graphics and audio objects rendered by applications. For example, for a given object of interest, it would be of interest to know how often that object appeared in frames, the length of each such exposure, the size of that object when it appeared, the extent to which the object was obscured, the angle in which it was viewed, etc. In the case where the object was part of an advertisement, such information would be useful for calculating advertising royalty fees (e.g., for CPM-based royalties). However, for the reasons discussed above, it is difficult to provide such functionality with software products that have already been deployed in the field or purchased by consumers or others, or where the source code is not available.

What is desired then is a system, method and computer program product for dynamically enhancing an application, such as a video game, executing on a computing device, without having to change and recompile the original application code. Dynamically enhancing the application should include the ability to dynamically modify graphics and/or audio information generated by the application during execution, to dynamically render additional graphics and/or audio information during execution of the application, or to perform other functions relating to the executing application that are not provided for or invoked by the source code of the application. What is also desired is a system, method and computer program product for dynamically tracking and determining the impact of objects rendered and/or referenced by an application, without having to change and recompile the original application code. It is desired to track and measure the impact of applications enhanced as described herein, and also track and measure applications without such enhancements (i.e., in their original form). This latter case may be used in order to collect valuable information to understand the "rating" (according to popularity, exposure parameters, etc.) of each such original object to later on be able to prioritize where one may want to advertise, or what objects one may want to measure/track.

BRIEF SUMMARY OF THE INVENTION

The present invention provides a system, method and computer program product for dynamically enhancing an application, such as a video game, executing on a computing device, without having to change and recompile the original application code. In one implementation, dynamically enhancing the application includes the ability to dynamically modify graphics and/or audio information generate by the application during execution. In another implementation, dynamically enhancing the application includes the rendering of additional graphics and/or audio content during execution of the application. In still other implementations, dynamically enhancing the application includes the performance of other functions relating to the executing application that are not provided for or invoked by the source code of the application, such as measuring and tracking the exposure of objects of interest.

In one implementation, a system in accordance with an embodiment of the present invention includes a staging environment that monitors the execution of the application and indexes a subset of items of graphics and/or audio information generated by the application into a first database. The subset may be small or encompass all the objects and information generated by the application. Note that the staging environment is not required in all embodiments. For example, in the case where one wants to calculate the "rating" of various objects inside the game, one may want to track all objects in the production (run-time) environment in order to know what objects are more valuable than others. A system administrator or other entity then populates a second database by manual or automated means with one or more business rules, wherein each business rule is associated with zero or more of the items indexed in the first database. Business rules may also instruct the run-time systems (as follows), on what objects to measure/track. The system further includes a run-time environment that identifies items of graphics and/or audio information as they are generated by the application during run-time, uses the second database to determine if an identified item is associated with a business rule, and, responsive to a determination that an identified item is associated with a business rule, applies the business rule. Application of the business rule may result in the modification of graphics and/or audio information generated by the application during execution, the rendering of additional graphics and/or audio information, or the performance of other functions relating to the executing application that are not provided or invoked by the source code of the application, including the measurement of specific objects.

The invention includes an additional embodiment for dynamically measuring attributes of objects rendered and/or referenced by software applications, without the need to revise the source code of such applications. This embodiment includes an optional object tagging component that executes in the staging environment; and an object measurement component that executes in the run-time environment. The object tagging component is responsible for generating information about what objects are to be tracked/measured. When wishing to be able to track a subset of objects, one embodiment of the invention is to intercept a function call issued by a first instantiation of the application executing in the staging environment, determine if an object referenced by the function call satisfies tagging criteria, and tag the object as an object of interest if the object is determined to satisfy the tagging criteria. The object measurement component intercepts a function call issued by the application executing in the run-time environment, determines if an object referenced by the function call is an object of interest, and determines an impact of the object if the object is determined to be an object of interest.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIG. 1 illustrates the physical components of a system that facilitates the dynamic enhancement of an application executing on a computing device in accordance with an embodiment of the present invention.

FIG. 2 illustrates the software components of a system that facilitates the dynamic enhancement of an application executing on a computing device in accordance with an embodiment of the present invention.

Figure 13:
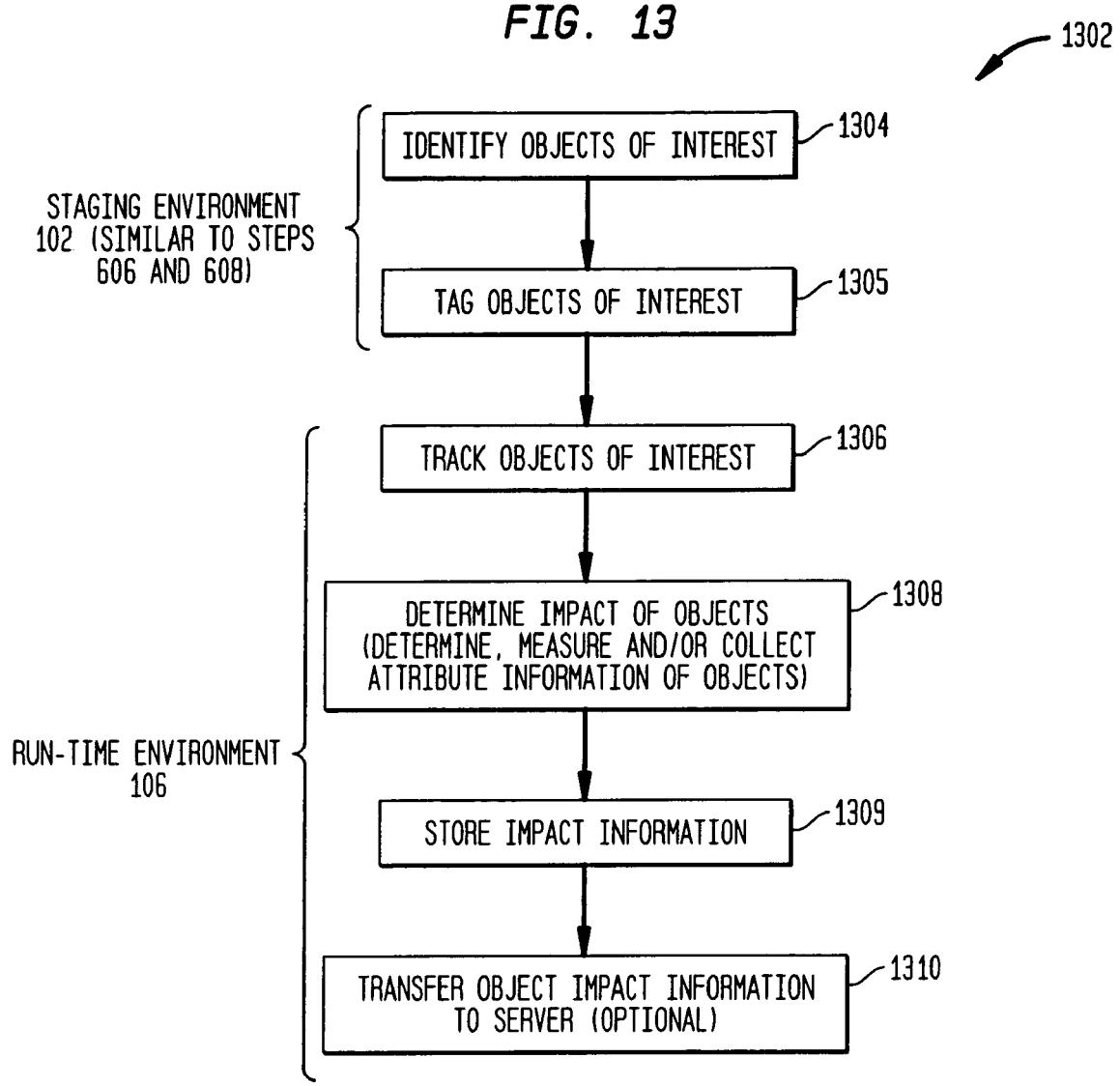

FIG. 13 illustrates a flowchart of a method for dynamically tracking and determining the impact of objects rendered and/or referenced by an application, without having to change and recompile the original application code, according to an embodiment of the invention. As shown in FIG. 13, some of the process steps are performed in staging environment 102, and others are performed in run-time environment 106.

FIG. 14 illustrates a flowchart of a method used in a staging environment for tagging objects of interest, according to an embodiment of the invention.

Figure 15A:
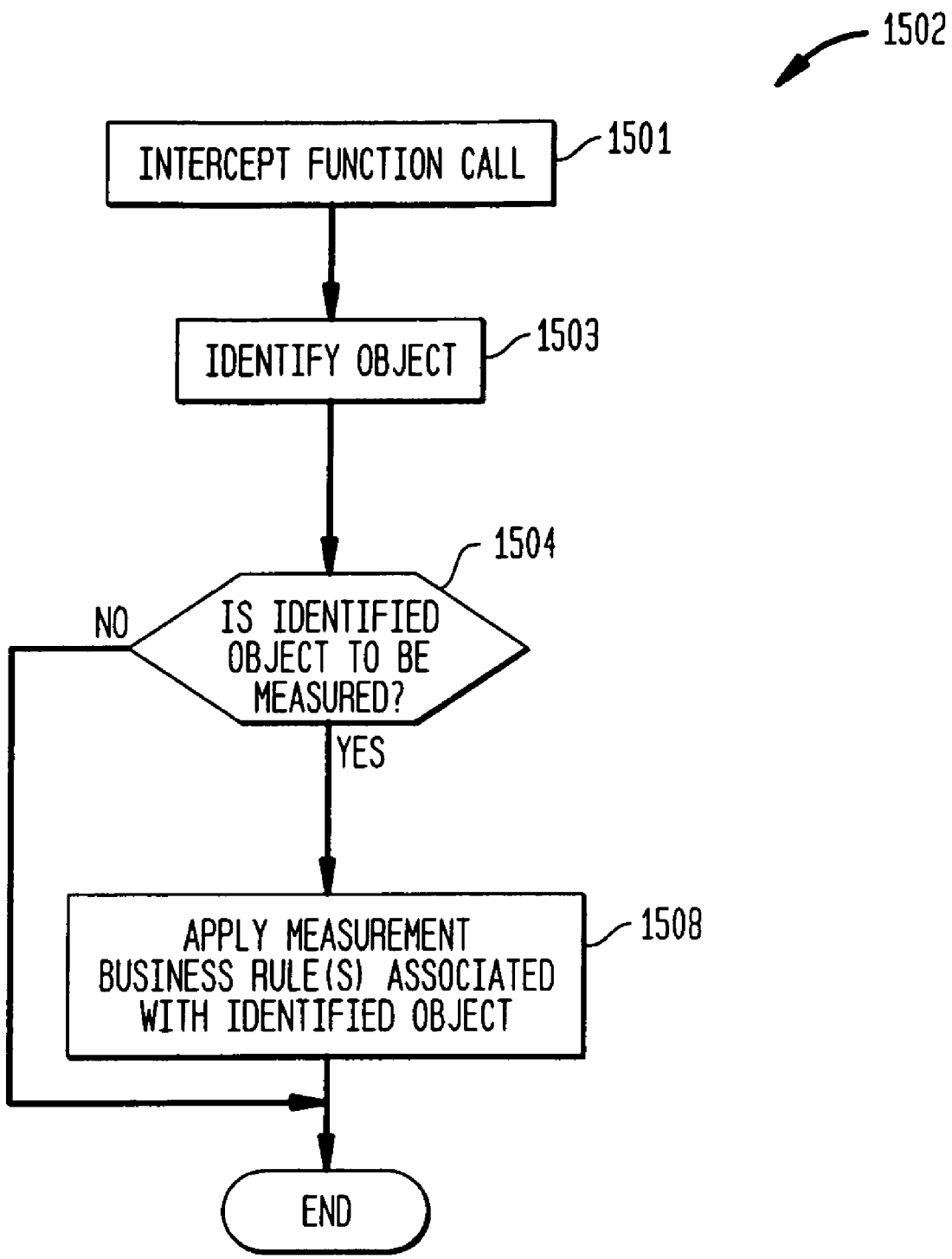

FIG. 15A illustrates a flowchart of a method used in a run-time environment for tracking and determining the impact of an object of interest, according to an embodiment of the invention.

Figure 15B:
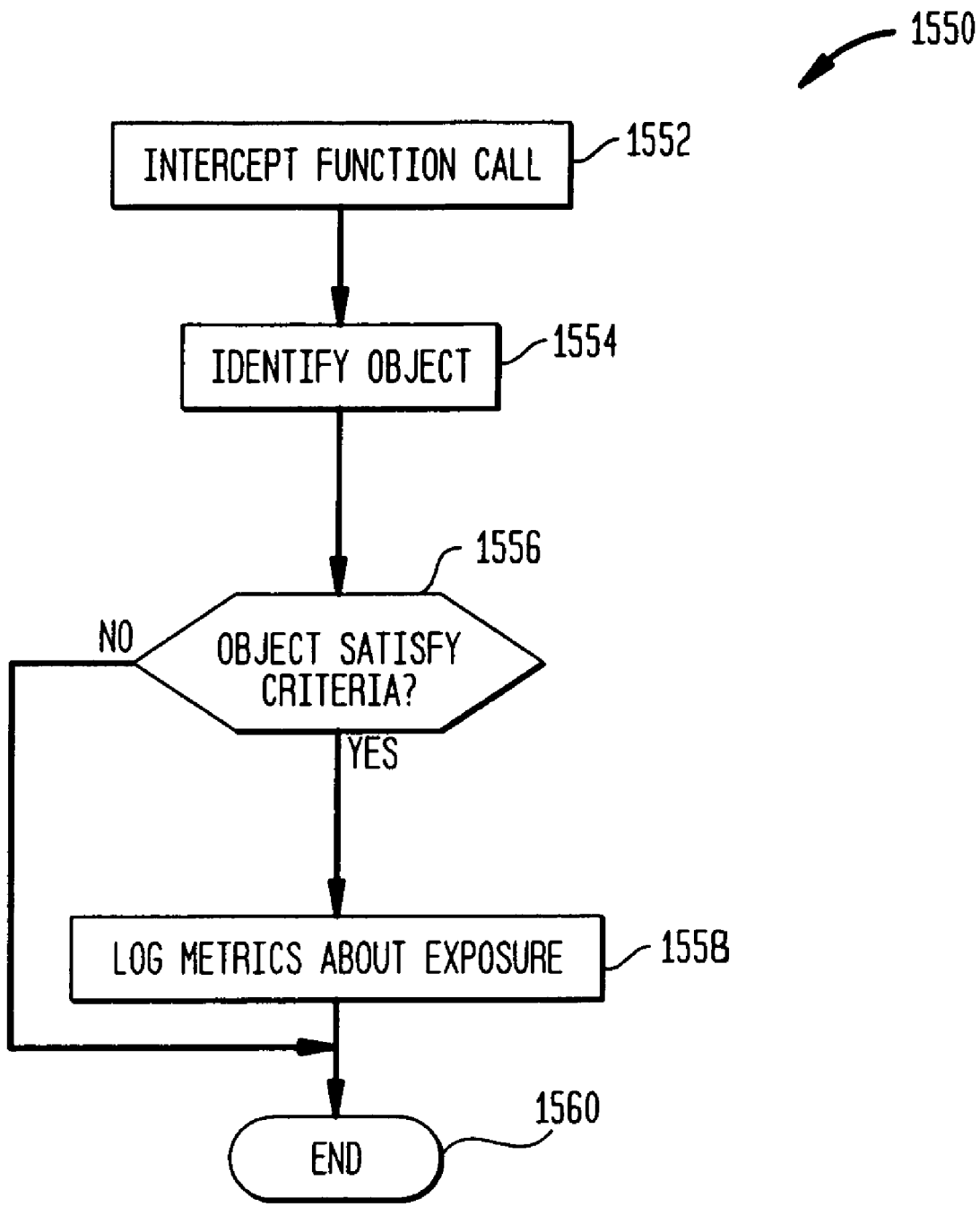

FIG. 15B illustrates a flowchart of a method used in a run-time environment for tracking and determining the impact of an object of interest, according to an alternative embodiment of the invention.

Figure 16:
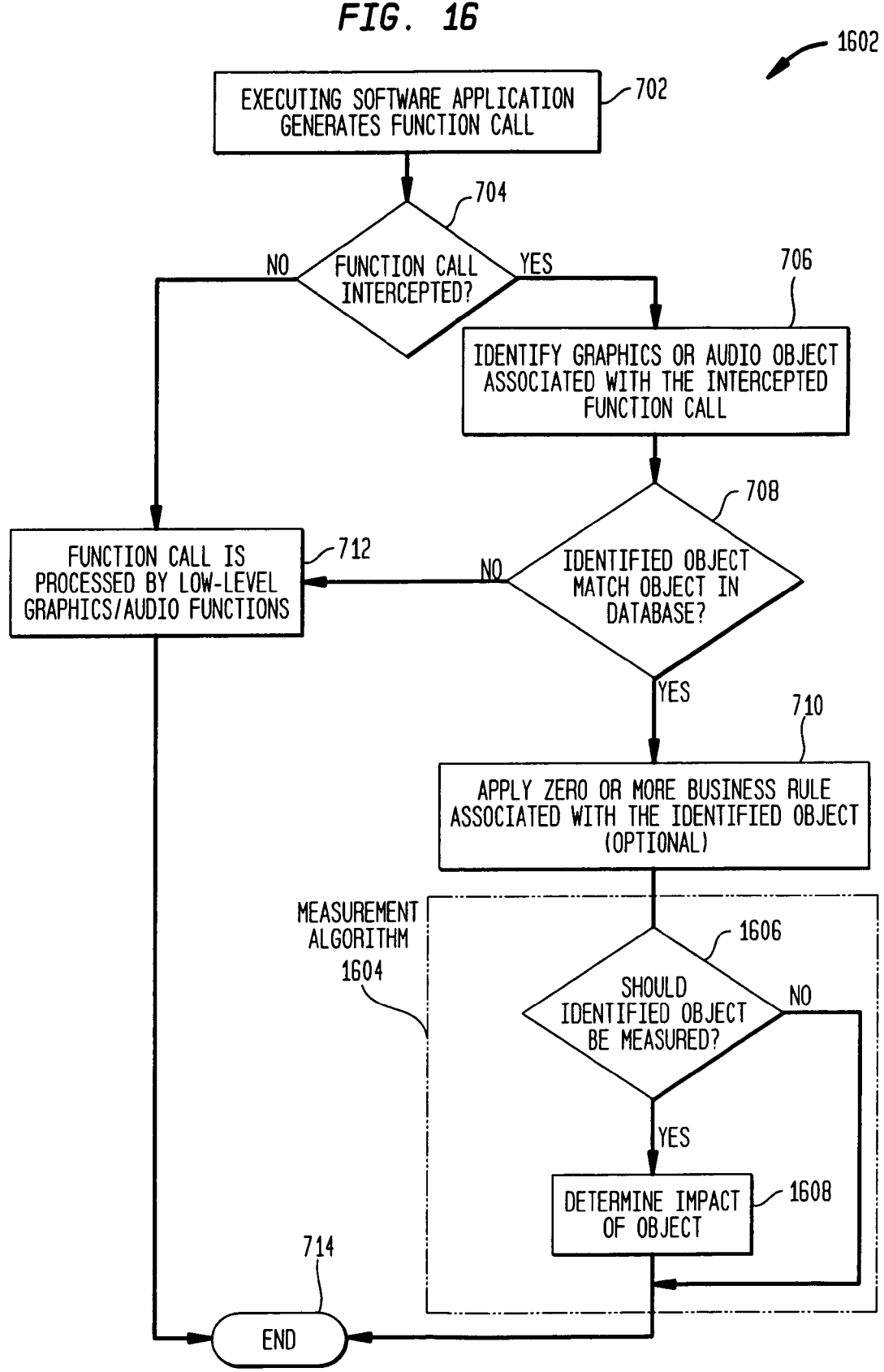

FIG. 16 illustrates a flowchart of a method used in a run-time environment for tracking and determining the impact of an object of interest, according to another alternative embodiment of the invention.

Figure 17:
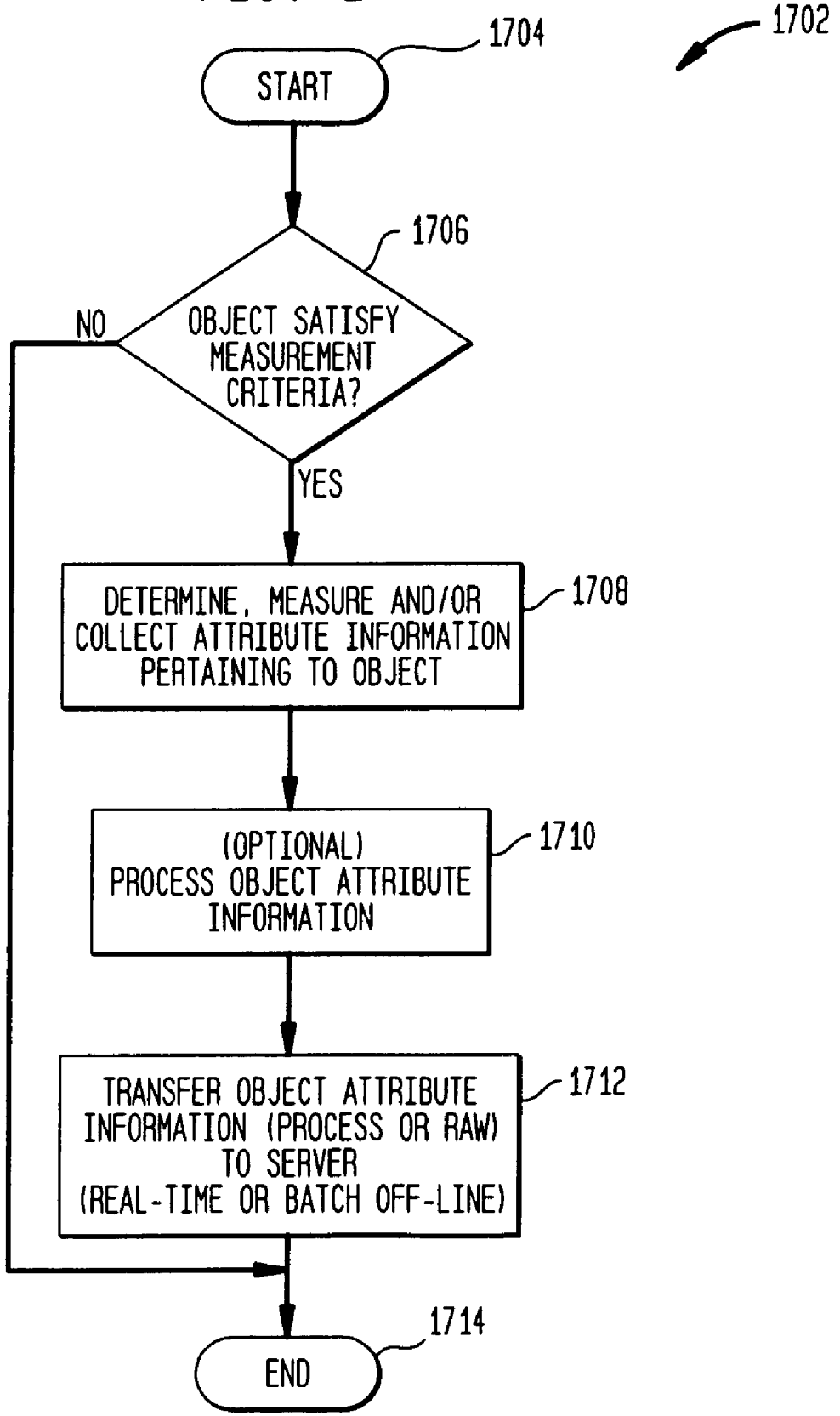

FIG. 17 is a flowchart illustrating a process for determining, measuring and/or collecting attribute information of an object of interest, according to an embodiment of the invention.

Figure 18:
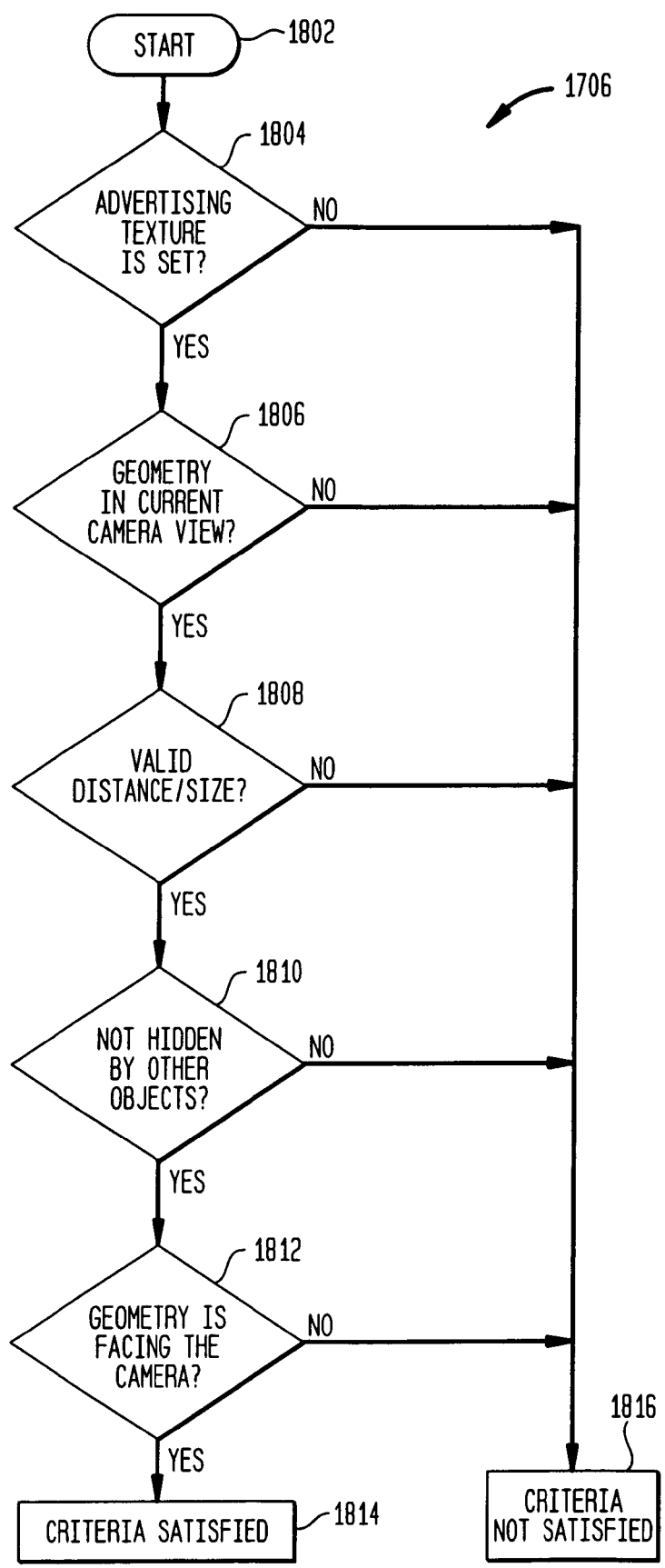

FIG. 18 illustrates an example of a flowchart of a method used in a run-time environment illustrating measurement criteria used to determine, measure and/or collect attribute information of an object of interest, according to an embodiment of the invention.

Figure 19:
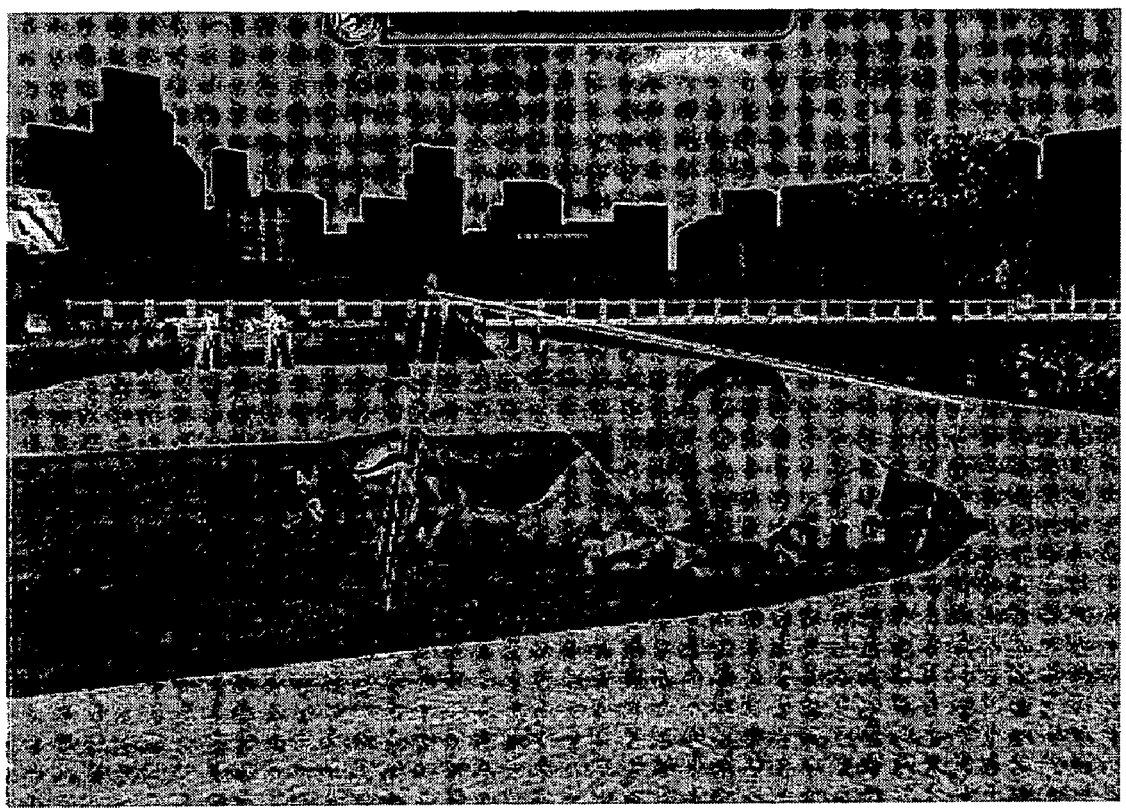

FIG. 19 is an example scene illustrating the manner in which an object (the camel) can be manually selected for subsequent tracking and measuring, according to an embodiment of the invention.

Figure 20:
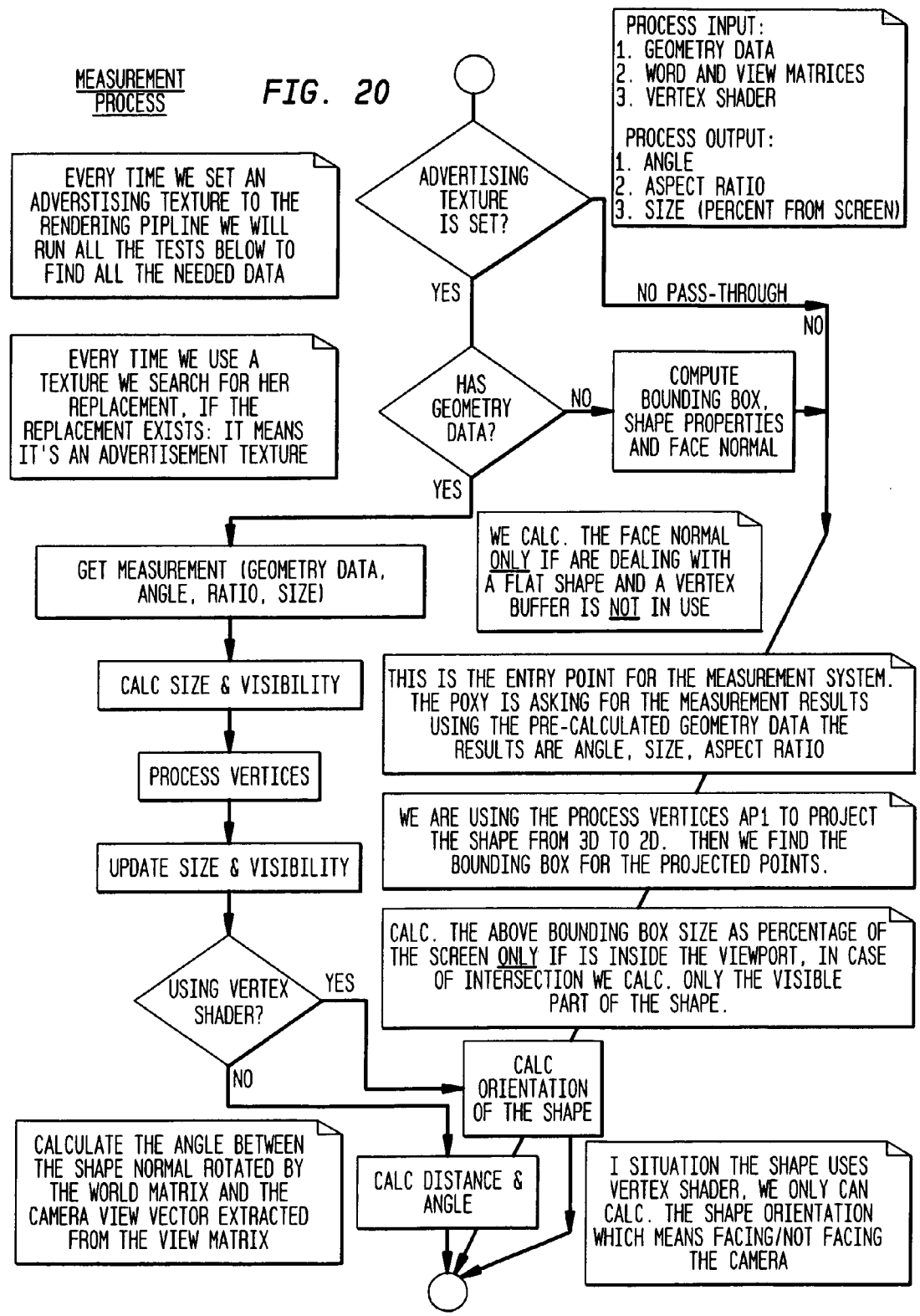

FIG. 20 is a flowchart illustrating an example embodiment for measuring exposure of an object using DirectX.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. System for Dynamically Enhancing a Software Application Executing on a Computing Device FIG. 1 illustrates the hardware components of an exemplary system 100 that facilitates the dynamic enhancement of an application executing on a computing device in accordance with an embodiment of the present invention. As shown in FIG. 1, system 100 includes both a staging environment 102 and a run-time environment 106. Staging environment 102 performs processing steps that must occur to facilitate operations that will later be performed by run-time environment 106. In particular, and as will be explained in more detail herein, staging environment 102 monitors a software application, such as a video game, during execution on a computing device, identifies graphics and audio objects generated by the application, and indexes each of these objects in a staging environment information database 104 along with a unique identifier (ID). Ideally, this process need only be carried out once per software application.

In an alternative embodiment, staging environment information database 104 does not include object index information. Instead, or in addition to such object index information, the staging environment information database 104 includes rules and/or criteria that objects must satisfy so as to be tracked and measured, or to be otherwise processed, according to the embodiments described herein.

As will be described in more detail herein, after staging environment information database 104 has been populated by staging environment 102, a system administrator or other entity then populates a business rules database 108 by manual or automated means with a set of "business rules", wherein each business rule in database 108 is associated with one or more of unique IDs of objects indexed in staging environment information database 104.

Run-time environment 106 represents the environment in which an end-user actually runs the application software. The application is the "same" as the application executed in staging environment 102 in that it is another copy or instance of essentially the same computer program, although it need not be completely identical. As will be described in more detail herein, run-time environment 106 monitors the execution of the application on a computing device and also identifies application-generated graphics and audio objects. If run-time environment 106 determines that an object generated by the application matches a business rule associated with the above-mentioned object in business rules database 108, then it applies the business rule. The business rule may be used, for example, to determine whether or not to modify the object in run-time (i.e., during execution of the software application) although other business rules will also be described herein.

In terms of hardware components, each of staging environment 102 and run-time environment 106 consists of a computing device that is configured to execute software applications that generate graphics and audio information. Each computing device further includes application program interfaces for rendering and displaying the application-generated graphics information and for playing back the application-generated audio information. For the sake of convenience, from this point forward, each of staging environment 102 and run-time environment 106 will be described as comprising a personal computer (PC) based computer system, although the invention is not so limited. For example, staging environment 102 and run-time environment 106 may each comprise a server, a console, a personal digital assistant (PDA), or any other computing device that is capable of executing software applications and displaying associated application-generated graphics and audio information to an end-user.

FIG. 2 illustrates the software components of system 100. As shown in FIG. 2, staging environment 102 includes an application 202, an interception component 204, an indexing component 206, and low-level graphics/audio functions 208. Application 202 is a software application, such as a video game, that is executed within staging environment 102. Low-level graphics/audio functions 208 are software functions resident in memory of the computer system that are accessible to application 202 and that assist application 202 in the rendering of application-generated graphics information and the playing of application-generated audio information. In an embodiment, low-level graphics/audio functions 208 comprise one or more functions within a low-level application program interface (API) such as DirectX® or OpenGL®.

Application 202 is programmed such that, during execution, it makes function calls to low-level graphics/audio functions 208. The interaction of application 202 with low-level graphics/audio functions 208 is well-known in the art. However, in accordance with an embodiment of the present invention, such function calls are intercepted by interception component 204 and provided to an indexing component 206 prior to being passed to low-level graphics/audio functions 208. Interception component 204 and indexing component 206 are software components that are installed on the computer system of staging environment 102 prior to execution of application 202. As will be described in more detail herein, indexing component 206 identifies graphics and audio objects associated with the intercepted function calls and indexes each of the objects in staging environment information database 104 along with a unique ID.

In an implementation of the present invention, interception component 204 comprises one or more emulated versions of corresponding low-level graphics/audio functions 208. For example, in an implementation in which low-level graphics/audio functions 208 are contained in graphics and audio libraries (such as in dynamic link libraries, or DLLs), interception component 204 comprises emulated versions of one or more of those libraries. These emulated libraries have the same names as the original libraries that they are intended to replace so that they are linked to application 202 at run-time. A particular example of interception by emulation will now be explained with reference to FIGS. 3 and 4.

Figure 3:
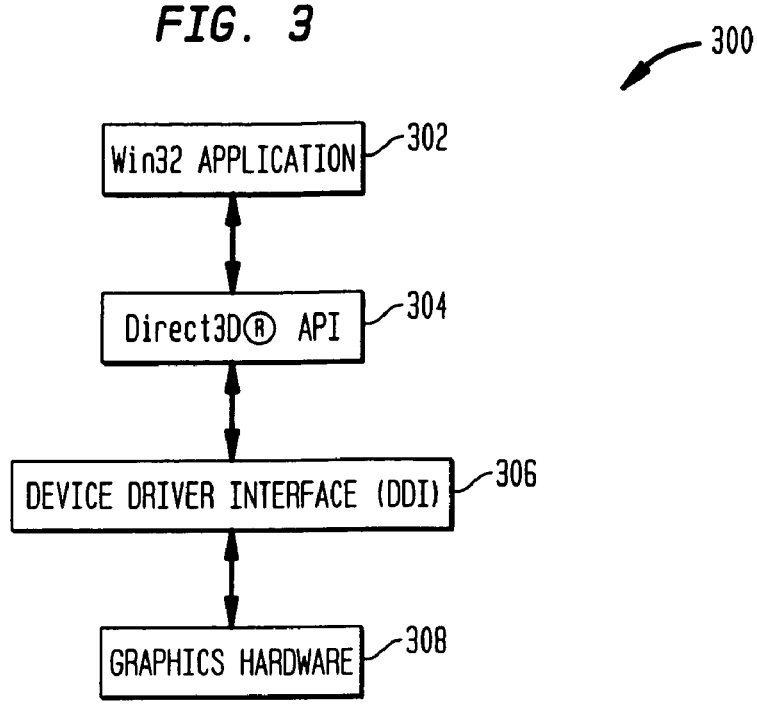
FIG. 3 illustrates a conventional software architecture for a Microsoft® Windows® based PC that utilizes graphics libraries.

FIG. 3 illustrates a conventional software architecture 300 for a Microsoft® Windows® based PC. As shown in FIG. 3, software architecture 300 includes a 32-bit Microsoft® Windows® application 302 executing on the PC. During execution, application 302 makes function calls to a Direct3D® API 304 in a well-known manner. As will be appreciated by persons skilled in the relevant art(s), Direct3D® API 304 comprises a series of libraries that are resident in PC memory and accessible to application 302 and that include functions that may be called by application 302 for rendering and displaying graphics information. In response to receiving the function calls from application 302, Direct3D® API 304 determines if such functions can be executed by graphics hardware 308 within the PC. If so, Direct3D® API 304 issues commands to a device driver interface (DDI) 306 for graphics hardware 308. DDI 306 then processes the commands for handling by graphics hardware 308.

Figure 4:
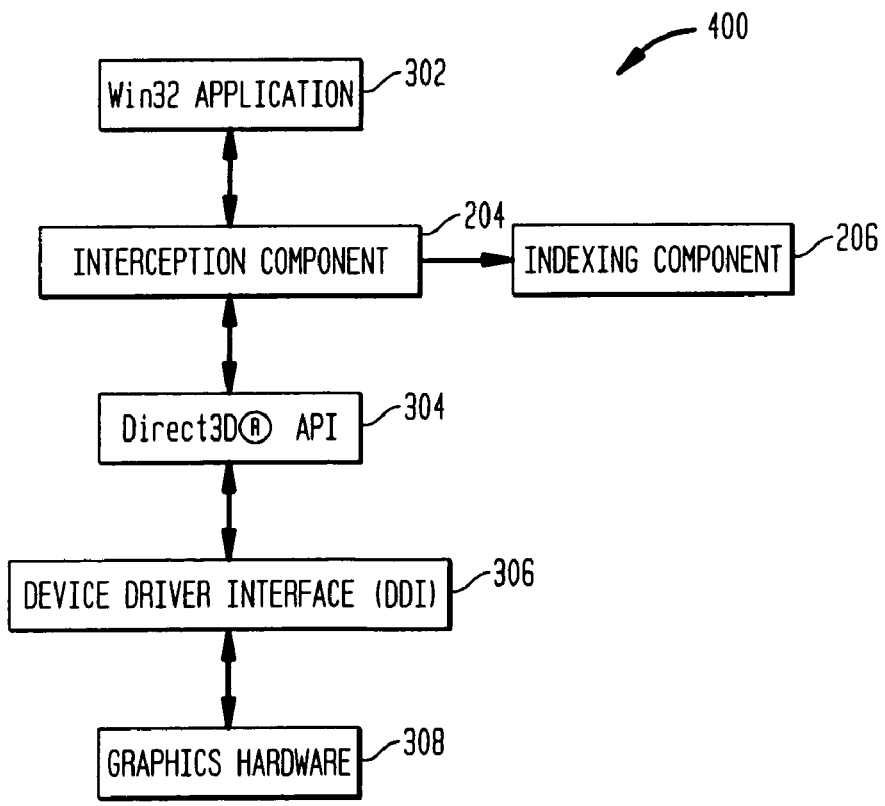
FIG. 4 illustrates a software architecture of a staging environment that includes emulated graphics and audio libraries, comprising components for indexing graphics and audio objects, in accordance with an embodiment of the present invention.

In contrast to the conventional software architecture illustrated in FIG. 3, FIG. 4 illustrates a software architecture including emulated graphics and audio libraries in accordance with an embodiment of the present invention. As shown in FIG. 4, interception component 204 has been inserted between application 302 and Direct3D® API 304. This may be achieved by emulating one or more graphics or audio libraries within Direct3D® API 304. As a result, certain function calls generated by application 302 are received by interception component 204 rather than Direct3D® API 304. Interception component 204 provides the intercepted function calls, or graphics and audio objects associated with the intercepted function calls, to an indexing component 206. Interception component 204 also passes the function calls to Direct3D® API 304 by placing calls to that API, where they are handled in a conventional manner. It is noted, however, that the function calls need not necessarily be passed to Direct3D® API 304 in order to practice the invention.

Depending on the operating system, emulating a genuine graphics API can be achieved in various ways. One method for emulating a genuine graphics API is file replacement. For example, since both DirectX® and OpenGL® are dynamically loaded from a file, emulation can be achieved by simply replacing the pertinent file (OpenGL.dll for OpenGL® and d3dX.dll for DirectX®, where X is the DirectX® version). Alternatively, the DLL can be replaced with a stub DLL having a similar interface, which implements a pass-through call to the original DLL for all functions but the hook functions.

Another method that may be used is to intercept or "hook" function calls to the API using the Detours hooking library published by Microsoft® of Redmond, Wash. Hooking may also be implemented at the kernel level. Kernel hooking may include the use of an operating system (OS) ready hook to enable a notification routine for an API being called. Another technique is to replace the OS routines by changing the pointer in the OS API table to a hook routine pointer, chaining the call to the original OS routine before and/or after the hook logic execution. Another possible method is API-based hooking technique the performs the injection of a DLL to any process that is being loaded, by setting a system global hook or by setting a registry key to load such a DLL. This injection is done only to have the hook function running in the process address space. While the OS loads such a DLL, a DLL initialization code changes the desired DLL dispatch table. Changing the table causes the pointer to the original API implementation to point to the DLL implementation (only to the desired API) and thus hooking the API. Hooking techniques are described, for example, at the web page http://www.codeguru.com/system/apihook.html. Note that the above described hooking techniques are presented only by way of example, and are not meant to limit the invention to any of these techniques. Other tools and methods for intercepting function calls to graphics or audio APIs are known to persons skilled in the relevant art(s).

As further shown in FIG. 2, run-time environment 106 includes an application 210, an interception component 212, business logic 214, and low-level graphics/audio functions 216. Application 210 is the "same" as application 202 of staging environment 102 in that it is another copy or instance of essentially the same computer program, although it need not be completely identical. Low-level graphics/audio functions 216 are software functions resident in memory of the computer system that are accessible to application 210 and that assist application 210 in the rendering of application-generated graphics information and the playing of application-generated audio information. Low-level graphics/audio functions 208 and 216 are similar in the sense that they provide the same functionality and services to application 202 and application 210, respectively, through similar APIs.

During execution on the computer system of run-time environment 106, application 210 makes function calls to low-level graphics/audio functions 216 in the same well-known manner that application 202 made function calls to low-level graphics/audio functions 208 in staging environment 102. However, in accordance with an embodiment of the present invention, such function calls are intercepted by interception component 212, which either passes the function call on to low-level graphics/audio functions 216, on to business logic 214, or both. Interception component 212 and business logic 214 are software components that are installed on the computer system of run-time environment 106 prior to execution of application 210.

When interception component 212 intercepts a function call, it passes control, along with the relevant object, to business logic 214, which determines if the object is associated with one or more business rules in database 108. If the object is associated with a business rule in database 108, then business logic 214 applies the business rule.

In one implementation, application of the business rule results in modification of the object (which may include lighting sources, point of view, textures, or shading) during run-time. If no modification is to occur, the intercepted function call is simply passed on to low-level graphics/audio functions 216. If a modification is to occur then the function call may be handled by business logic 214 alone or by business logic 214 in conjunction with low-level graphics/audio functions 216. As will be described in more detail herein, modifying the object may include altering a portion of the object, replacing the object with a different object, or simply not rendering or playing back the object. The application of other business rules will also be described herein.

Figure 5:
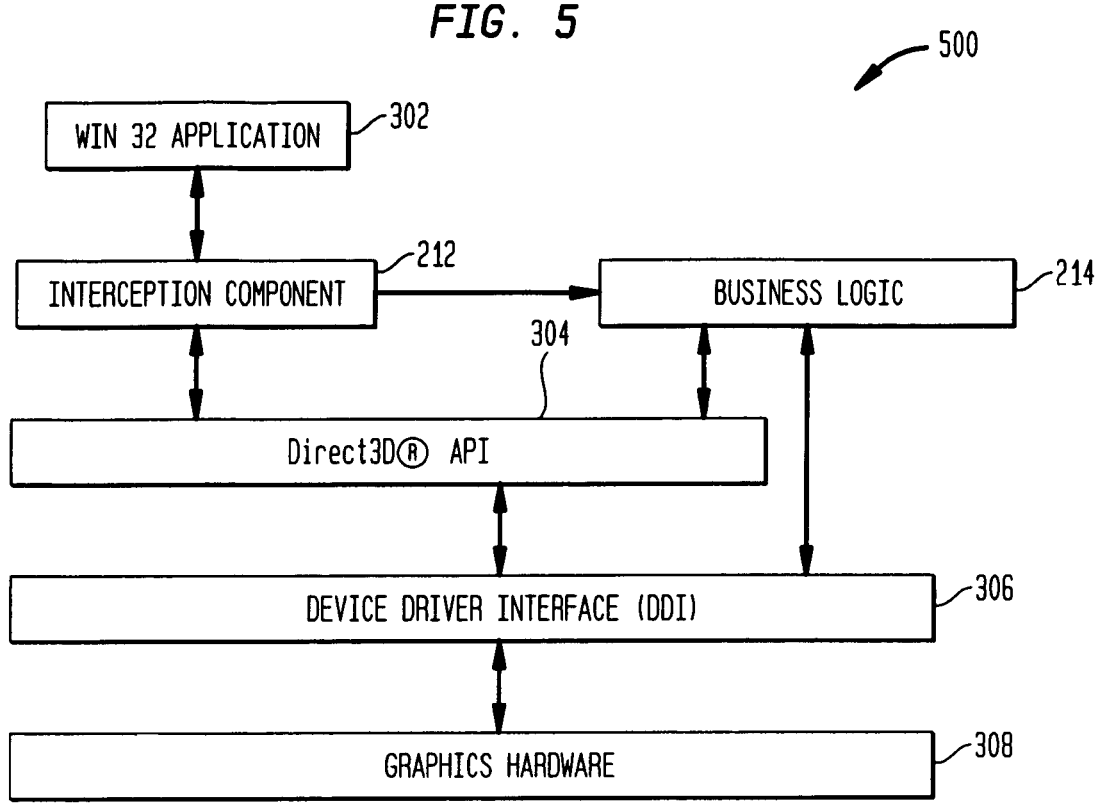
FIG. 5 illustrates a software architecture of a run-time environment that includes emulated graphics and audio libraries, comprising components that identify graphics and audio objects and apply business rules associated with the identified objects, in accordance with an embodiment of the present invention.

FIG. 5 illustrates an example software architecture for run-time environment 106 in which interception component 212 is implemented by way of emulation. As shown in FIG. 5, interception component 212 has been inserted between a Windows application 302 and a Direct3D® API 304. Like the software architecture described above with reference to FIG. 4, this is achieved by emulating one or more graphics or audio libraries within Direct3D® API 304. As a result, certain function calls generated by application 302 are received by interception component 212 rather than Direct3D® API 304. As also shown in FIG. 5, in an implementation, both interception component 212 and business logic 214 can place function calls to Direct3D® API 304 and business logic 214 can send commands directly to DDI 506. Whether or not business logic 214 has this capability depends upon the nature of the business rules being applied.

In one implementation, staging environment information database 104 is created or populated in local memory of the computer system of staging environment 102. A system administrator or other entity then populates business rules database 108 by manual or automated means with one or more business rules, wherein each business rule is associated with one or more of the objects indexed in the first database. The association between the business rule and an object is created by forming a relationship between the business rule and the unique ID of the object in database 108. In one implementation, a "wild card" scheme is used to permit a single business rule to be associated with a group of logically-related objects.

Generally speaking, a business rule is any logic that, when applied within the context of application 210, causes application 210 to perform a function that is not provided for in the original application source code. As noted above, a business rule may call for modification of a graphics object associated with an intercepted function call such that the graphics object, when rendered, appears differently than it would have if it were not so modified. For example, a business rule may cause advertising content to be dynamically inserted into a graphics object. Further examples of business rules and their application are set forth below in Section IV. However, these examples are provided for illustrative purposes only and are not intended to limit the present invention.

Because the business rules can be changed at any time by a system administrator or other entity, they provide a dynamic mechanism by which to enhance application 210. For example, the business rules provided a dynamic mechanism by which to augment graphics and audio content generated by that application.

In one implementation, once business rules database 108 has been created or updated by a system administrator or other entity, a copy of database 108 is transferred to local memory of the computer system of run-time environment 106. The transfer may occur by transferring a copy of database 108 to a recordable computer useable medium, such as a magnetic or optical disc, and then transferring the computer useable medium to run-time environment 106. Alternatively, a copy of database 108 may be transferred via a data communication network, such as a local area and/or wide area data communication network. In yet another implementation, database 108 is not transferred to local memory of the computer system of run-time environment 106 at all, but is instead stored at a central location in a computing network, where it can be accessed by multiple run-time environments 106 using well-known network access protocols. However, these examples are not intended to be limiting and persons skilled in the relevant art(s) will appreciate that a wide variety of methods may be used to make database 108 available to run-time environment 106.

Figure 6:
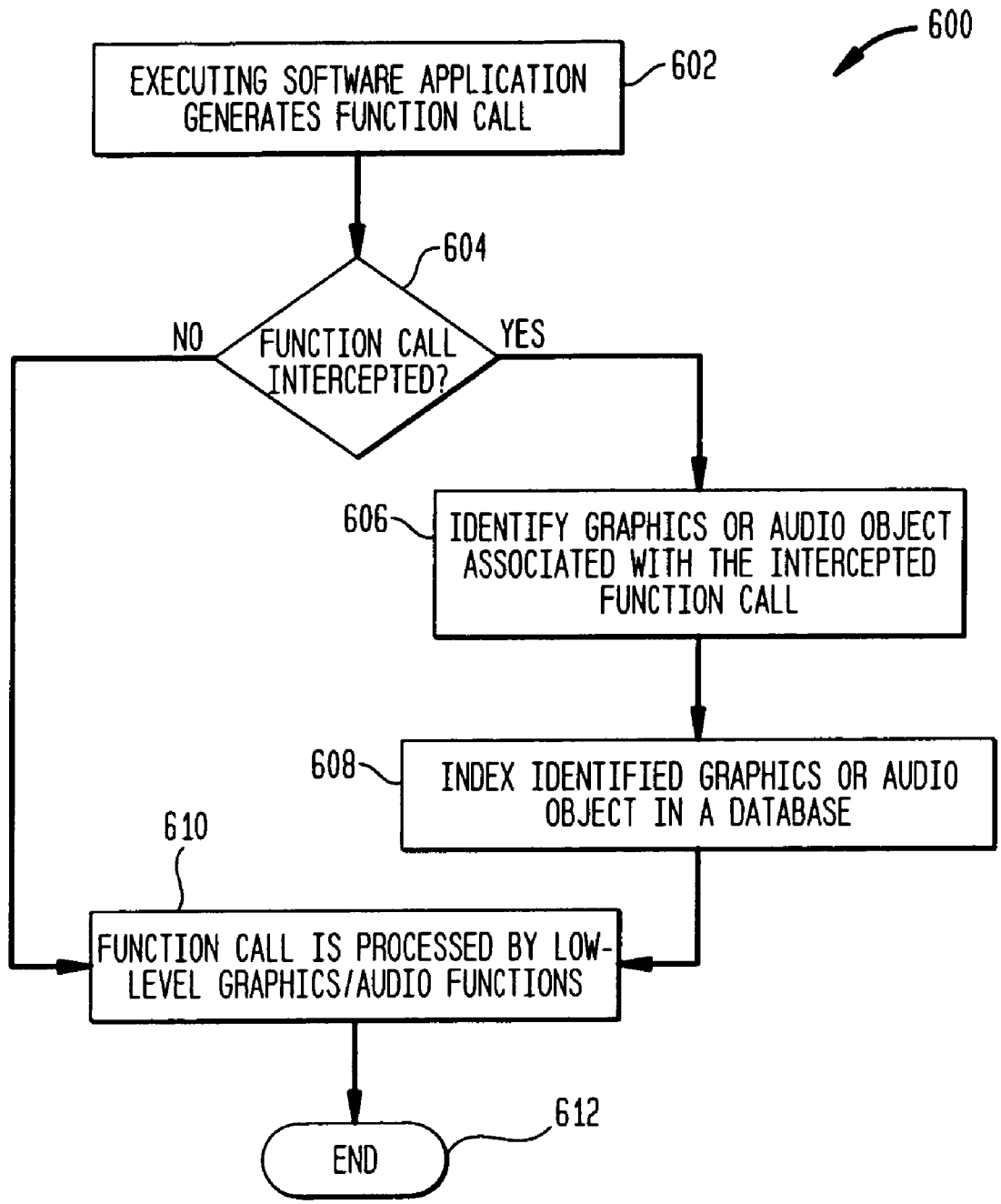
FIG. 6 illustrates a flowchart of a method used in a staging environment for facilitating the dynamic enhancement of an application executing on a computing device in accordance with an embodiment of the present invention.

II. Method for Dynamically Enhancing a Software Application Executing on a Computing Device FIG. 6 illustrates a flowchart 600 of a method for facilitating the dynamic enhancement of an application executing on a computing device in accordance with an embodiment of the present invention. FIG. 6 essentially describes the processing steps carried out by staging environment 102 with respect to the handling of a single graphics or audio function call generated by a single software application. Persons skilled in the relevant art(s) will readily appreciate that a software application will likely generate numerous such function calls, and thus that the method of flowchart 600 would likely be carried out numerous times during execution of the software application. The method will now be described in part with continued reference to certain software components illustrated in FIG. 2 and described above in reference to that figure. However, persons skilled in the relevant art(s) will appreciate that the method of flowchart 600 is not limited to that implementation.

The following description of the method of flowchart 600 assumes that each of the software components of staging environment 102 have already been installed on a computer system. The method also assumes that software application 202 is executing on the computer system. Executing software application 202 encompasses both launching the application and interacting with the application through one or more user interfaces in a manner that causes the application to generate graphic and/or audio information. For example, if application 202 is a video game, executing the application encompasses both launching the video game and playing through at least a portion of the video game using appropriate user input/output (I/O) devices.

The method begins at step 602, in which software application 202 generates a function call directed to low-level graphics/audio functions 208. At step 604, it is determined whether or not the function call is intercepted by interception component 204. If no interception occurs, then processing proceeds to step 610, where the function call is handled by low-level graphics/audio functions 208 in a conventional manner. Processing of the function call then ends as indicated at step 612. However, if the function call has been intercepted, processing instead proceeds to step 606.

At step 606, interception component 204 identifies a graphics or audio object associated with the intercepted function call. A graphics object may comprise a model, texture, image, parameter, or any other discrete set of information or data associated with the intercepted function call and used in rendering a graphics information on behalf of application 202. An audio object may comprise an audio file, a digital sound wave, or any other discrete set of information or data associated with the intercepted function call and used in playing back audio information on behalf of application 202. The graphics or audio object may be part of the function call itself or may be addressed by or pointed to by the function call. For example, if the intercepted function call is a SetTexture function call to the Direct3D® API, the associated graphics object may consist of a texture pointed to by the SetTexture function call.

At step 608, indexing component 206 indexes the graphics or audio object identified in step 606 in staging environment information database 104. In one implementation, indexing the object includes storing the object, or a portion thereof, in staging environment information database 104 along with a unique identifier (ID) for the object. The unique ID may be arbitrarily assigned or may be calculated based on information contained in the object itself. For example, in an implementation, the unique ID comprises an error correction code, such as a cyclic redundancy code (CRC), that is calculated based on all or a portion of the content of the graphics or audio object. In an alternate implementation, an encryption and/or hashing algorithm is applied to all or a portion of the content of the graphics or audio object to generate the unique ID. For example, the unique ID may be an MD5 hash signature that is calculated based on all or a portion of the content of the graphics or audio object. A benefit of generating a unique ID based on the content of the object itself is realized in run-time environment 106, where the unique ID instead of the object itself (which may be quite large), can be used to search for matches in business rules database 108. In one implementation of the present invention, the unique ID alone is stored in business rules database 108 to represent an underlying graphics or audio object. As a result, the storage requirements for business rules database 108 can be substantially reduced.

In one implementation, the unique ID is not calculated as part of the method of flowchart 600 but instead is calculated by a separate process that occurs after completion of the method when staging environment information database 104 has been populated with graphics and audio objects.

In an alternative embodiment, not all objects identified in step 606 are indexed in step 608. Instead, in order for an identified object to be indexed, the object must satisfy some criteria or rule. This operation is similar to that described below with reference to step 1406 in FIG. 14 and/or step 1556 in FIG. 15B.

At step 610, after indexing is complete, the function call is then passed to low-level graphics/audio functions 208, where it is handled in a conventional manner. After this, processing of the function call ends as indicated at step 612.

As noted above, the method of flowchart 600 would likely be executed numerous times during execution of a software application within staging environment 102. Furthermore, the method may be applied to the execution of multiple software applications in order to index graphics and audio objects therefrom. The indexed graphics and audio objects for the multiple applications may be stored in a single staging environment information database 104 or in multiple databases 104. Each of these databases may then be used to populate one or more business rules databases 108, which are provided for use in one or more run-time environments 106.

Figure 7:
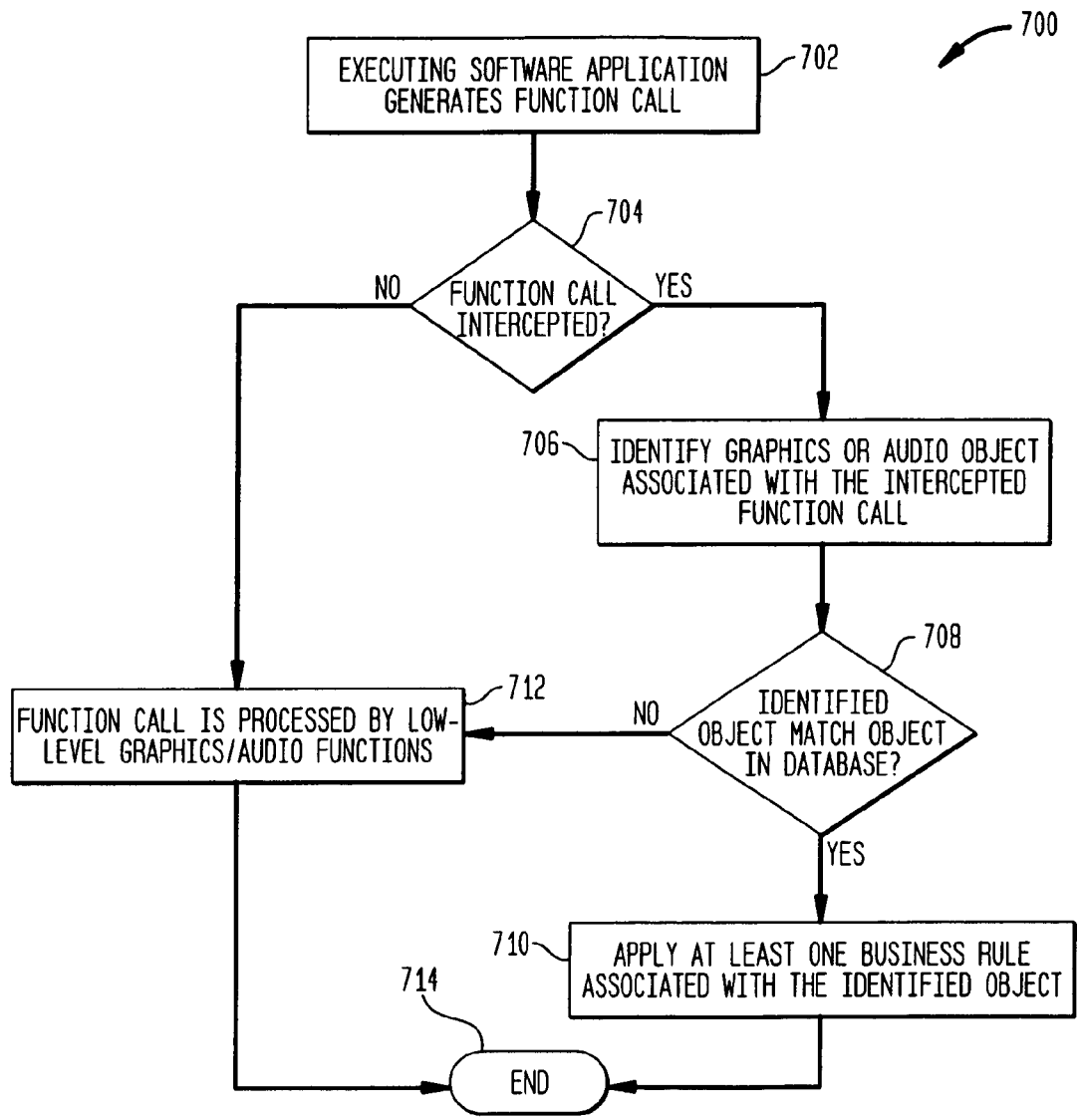
FIG. 7 illustrates a flowchart of a method used in a run-time environment for dynamically enhancing an application executing on a computing device in accordance with an embodiment of the present invention.

FIG. 7 illustrates a flowchart 700 of a method for dynamically enhancing an application executing on a computing device in accordance with an embodiment of the present invention. FIG. 7 essentially describes the processing steps carried out by run-time environment 106 with respect to the handling of a single graphics or audio function call generated by a single software application. Persons skilled in the relevant art(s) will readily appreciate that a software application will likely generate numerous such function calls, and thus that the method of flowchart 700 would likely be carried out numerous times during execution of the software application. The method will now be described in part with continued reference to certain software components illustrated in FIG. 2 and described above in reference to that figure. However, persons skilled in the relevant art(s) will appreciate that the method of flowchart 700 is not limited to that implementation.

The following description of the method of flowchart 700 assumes that each of the software components of run-time environment 106 have already been installed on a computer system. The method also assumes that software application 210 is executing on the computer system. Executing software application 210 encompasses both launching the application and interacting with the application through one or more user interfaces in a manner that causes the application to generate graphic and/or audio information.

The method begins at step 702, in which software application 210 generates a function call directed to low-level graphics/audio functions 216. At step 704, it is determined whether or not the function call is intercepted by interception component. If no interception occurs, then processing proceeds to step 712, where the function call is handled by low-level graphics/audio functions 216 in a conventional manner. Processing of the function call then ends as indicated at step 714. However, if the function call has been intercepted, processing instead proceeds to step 706.

At step 706, interception component 212 identifies a graphics or audio object associated with the intercepted function call. As noted above, a graphics object may comprise a model, texture, image, parameter, or any other discrete set of graphics information associated with the intercepted function call and an audio object may comprise an audio file, a digital sound wave, or any other discrete set of audio information associated with the intercepted function call. The graphics or audio object may be part of the function call itself or may be addressed by or pointed to by the function call. For example, if the intercepted function call is a SetTexture function call to the Direct3D® API, the associated graphics object may consist of a texture pointed to by the SetTexture function call.

At step 708, business logic 214 determines if the identified object is associated with at least one business rule in business rule database 108. This step may include comparing the identified object, or a portion thereof, to a graphics or audio object, or portion thereof, stored in database 108. Alternatively, this step may include calculating a unique ID for the identified object and then comparing the unique ID for the identified object to a set of unique IDs stored in database 108. For example, as described above in reference to FIG. 6, the unique ID may comprise an error correction code, such as a CRC, calculated based on all or a portion of the content of the identified object, or a signature, such as an MD5 hash signature, derived by applying an encryption and/or hashing algorithm to all or a portion of the content of the identified object. It should be noted that "wild cards" or other logical groupings of objects may be used in accordance with the present invention to associate a business rule with multiple objects. For example, business rules database 108 may include business rules that will be applied to all objects identified by a catch-all matching expression.

If the identified object is not associated with at least one business rule in database 108, then processing proceeds step 712 where the function call is processed by low-level graphics/audio functions 216 in a conventional manner.

However, if the identified object is associated with at least one business rule in database 108, then business logic 214 applies the at least one business rule as shown at step 710. In one implementation, the application of the business rule results in the modification of the identified object. Such modification may include replacing the identified object with a different object, altering the content of the identified object, or simply not rendering or playing the identified object at all. However, the present invention is not limited to simply modifying the object. For example, a business rule may include preceding the rendering or playing of the object with the rendering or playing of another object or succeeding the rendering or playing of the object with the rendering or playing of another object. Note that because application of the business rule may include rendering or playing an object, such application may include placing one or more function calls to low-level graphics/audio functions 216.

In fact, the business rule need not include the rendering of any graphics information or playing of any audio information. Instead the business rule may simply consist of performing some activity within the context of software application 210 in response to the identification of a certain graphics or audio object by interception component 212. By way of example, the business rule may include moving pointers associated with user input devices to predefined regions of the display screen (useful for auto-aiming in shooting games or for automatic orientation within on-screen game menus), generating a key sequence (such as inputting "cheat codes"), logging and/or reporting a user's progress within the software application, or other activities. Each of these events can be performed before, instead of, or after the graphics or audio object associated with an intercepted function call has been rendered or played by the original non-emulated low-level graphics or audio libraries.

After one or more business rules have been applied at step 710, processing of the function call then ends as shown at step 712.

III. Distribution/Installation of Software Components to Run-Time Environment As described above, an embodiment of the present invention facilitates the application of business rules to a software application executing on a computing device, thereby permitting the application to be enhanced in a dynamic manner that does not require modifying and recompiling the original application code. Additionally, because an embodiment of the invention can be implemented in run-time environment 106 using emulated libraries, the operation can be essentially transparent to the end user. Indeed, aside from the installation of the necessary software components (i.e., interception component 212, business logic 214, and optionally business rules database 108) in run-time environment 106, the end user need not take any proactive steps to link or interface the software application with an external software component.

Figure 8:
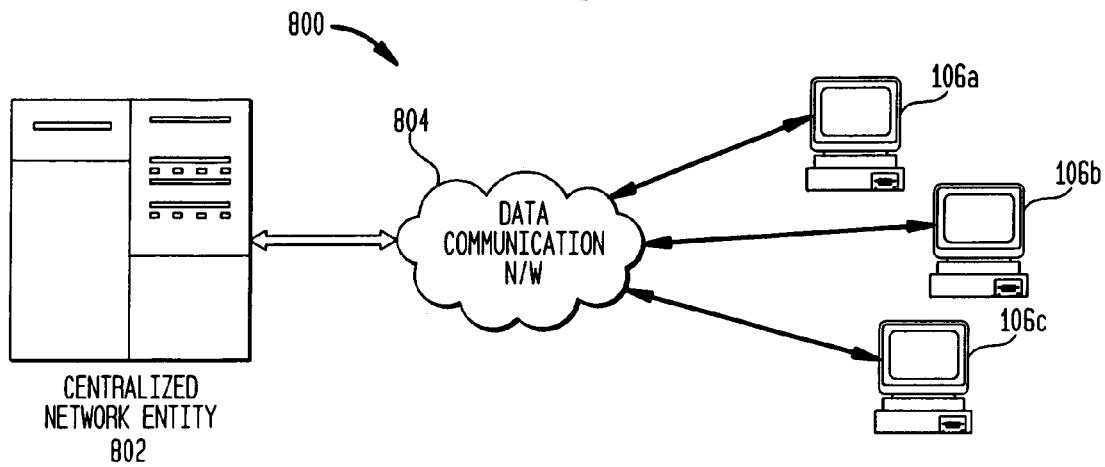
FIG. 8 illustrates a network system for distributing and/or accessing software components in accordance with an embodiment of the present invention.

The distribution of the necessary software components to the computing device of an end user may be achieved in a variety of ways. For example, the software components may be distributed from a centralized entity to a number of run-time environments over a data communication network, such as the Internet. Such a system is illustrated in FIG. 8, in which a centralized network entity 802 is shown communicating with a plurality of user run-time environments 106a, 106b and 106c over a data communication network 804. By combining such network-based distribution with auto-installation software, the installation of such components on an end-user's computing device may be achieved in a manner that advantageously requires minimal end user intervention. Furthermore, since only a single copy of the run-time components is needed on the end user machine, one can also bundle those components with one or more applications 210, In an implementation of the present invention, the business rules themselves are dynamic in the sense that an entity (for example, a publisher, retailer or service provider) can change them periodically to enhance a given application in different ways. Business rules can be changed or added by making modifications to business rules database 108. Copies of business rules database 108 or updates thereto may be distributed from a centralized network entity to multiple run-time environments 106 over a data communication network using a network system such as that shown in FIG. 8.

In an alternate implementation, copies of business rules database 108 are not distributed to run-time environments 106 at all but instead, business rules database 108 resides remotely with respect to run-time environments 106 and is accessed only when required via a data communication network, such as the Internet. For example, business logic rules database 108 may reside on a centralized network entity, such as a server, where it is accessed by computing devices associated with multiple run-time environments 106. Again, such a network configuration is illustrated in FIG. 8. This implementation is advantageous in that changes to the business rules need only be implemented once at the central server and need not be actively distributed to the multiple run-time environments 106.

In an implementation where interception component 212 comprises one or more emulated libraries, a determination may be made during installation of interception component 212 or at application run-time as to which libraries should be emulated. Consequently, different sets of libraries may be emulated for each software application that is to be dynamically enhanced. The determination may be based on the characteristics of the software application that is to be dynamically enhanced, upon some externally-provided metadata, or provisioned from the staging environment by one means or another.

IV. Example Applications of the Present Invention

Some exemplary applications of the present application will now be described. These examples are provided for illustrative purposes only and are not intended to limit the present invention in any way.

A. Embedding of In-Game Advertising

An implementation of the present invention facilitates the embedding of in-game advertising in games that were not designed to support such a feature. In accordance with this implementation, staging environment 102 operates to index the texture of a game-related surface, such as the hood of a car in a racing game, in staging environment information database 104. A system administrator then defines a business rule to overlay the hood of the car with a logo associated with an advertised product. That business rule is captured in business rules database 108 where it is associated with the texture for the hood of the car. In run-time environment 106, interception component 212 identifies the texture as it is accessed for rendering on an end-user's computer and business logic 214 matches it to the business rule stored in database 108. As a result, the business rule is applied to augment the image of the texture for the car hood with the product logo and to render the manipulated image to the screen. The end result is that the product logo will be displayed upon the car hood "inside" the graphic display associated with the game.

Based on the teachings provided herein, persons skilled in the relevant art(s) will appreciate that the present invention is equally applicable to the insertion of audio advertising content within an audio object played within the context of a game. Furthermore, the present invention is also applicable to render graphic and audio advertising content that bears no relation to any specific intercepted object and that is rendered or played independently of that object.

Figure 9:
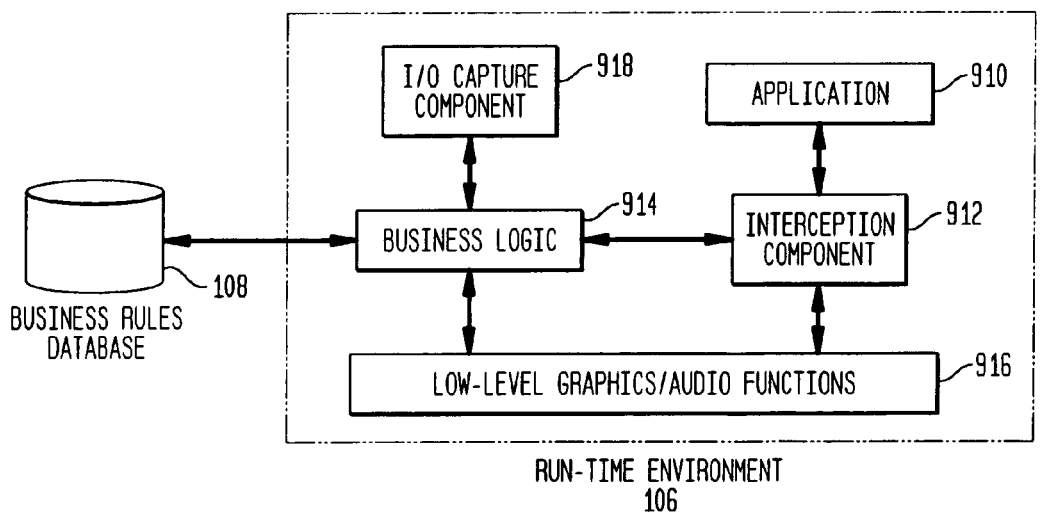
FIG. 9 illustrates an implementation of a run-time environment in accordance with the present invention that includes functionality for capturing input/output from an end user device and applying business rules based on a captured function call and a possible identification of an object.
Figure 10:
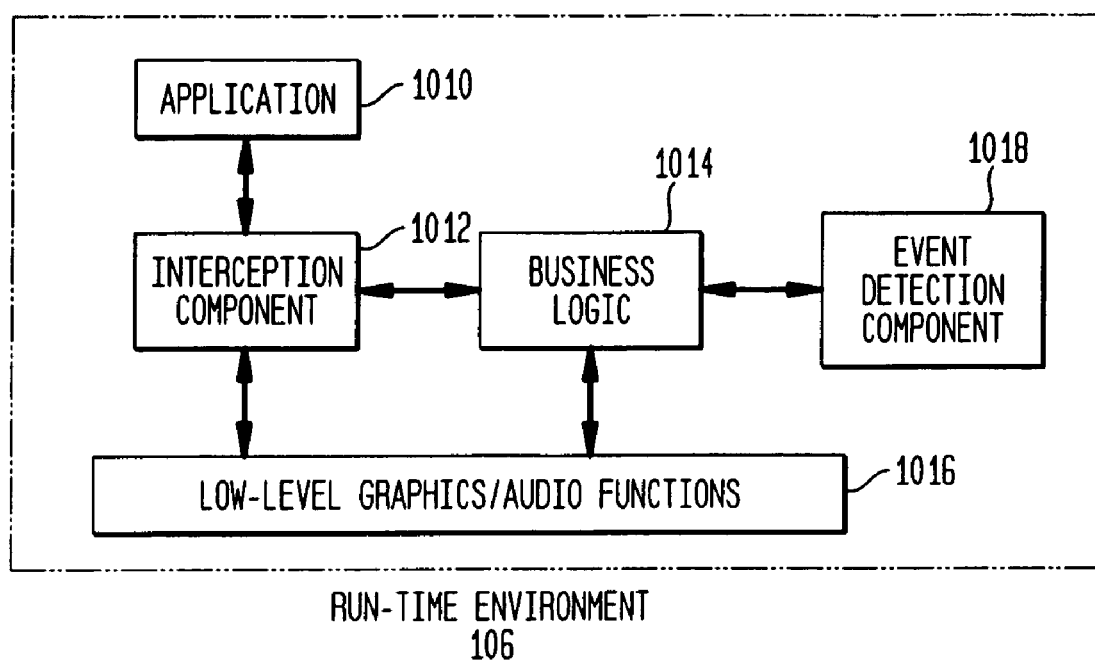
FIG. 10 illustrates an implementation of a run-time environment in accordance with the present invention that includes event detection functionality, logging and reporting such events.

In a further embodiment of the present invention, run-time environment 106 further includes logic for capturing input/output (I/O) from an end user device, such as a keyboard or mouse. The software components for such an embodiment are shown in FIG. 9. In particular, as shown in FIG. 9, the software components of run-time environment 106 include an application 910, low-level graphics/audio functions 916, and an interception component 912 "inserted" between them that is in communication with business logic 914, similar to the software architecture shown in FIG. 2. However, in the implementation shown in FIG. 9, an additional I/O capture component 918 has been provided that allows business logic 914 to monitor events associated with the use of a user input device such as a keyboard or mouse. In one implementation, this monitoring is achieved by emulating functions associated with processing mouse or keyboard input.

A system in accordance with FIG. 9 can be used to extend the functionality of an implementation of the present invention that facilitates the embedding of in-game advertising. For example, while an embedded product logo is being rendered within a graphic display associated with the game, I/O component 918 monitors user input to identify when a user has interacted with the logo, for example by pointing to the logo with a mouse and clicking. In response to a determination that user interaction has occurred, business logic 914 performs a function. By way of example, the function may include displaying a form for the user to enter data to be sent to a server, display some other graphic or audio content to the user, or provide the user with a prize or a notification that they will receive a prize.

B. Identifying Advancement and Achievements within a Game

In accordance with an implementation of the present invention, level advancement and achievements with a game can be identified and certain actions can be taken based on the advancement or achievement. For example, a business rule can be associated with a graphics or audio object identified in staging environment 102 that is unique to or representative of a certain level or stage within a game that is divided into levels or stages. When the same object is identified in run-time environment 106, the end user has reached the level or stage within the game and the business rule is applied. The business rule may include logging information about the achievement or advancement and then transmitting it to a centralized repository over a data communication network, such as the Internet, to enable tournaments and merit allocation schemes. Alternatively, in games that display game scores on the screen, the rendered information can be captured and the actual score the user has achieved can be logged and used as the data for enabling tournaments and merit allocation schemes.

C. Collecting Usage and Measured Information

In accordance with an embodiment of the present invention, the ability to measure rendering and/or exposure of objects in the game (or other computer application) can be logged and transmitted to a centralized server for various purposes, including, but not limited to:

a. Creating a search engine for the game. Allowing, for example, a search for all the users that have reached a certain level, that possess a certain weapon, etc.

b. Creating centralized leader boards and high-score tables, based on tracking the on-screen display of such scores.

c. Analyzing the information for product improvements (e.g., how much time do users spend on fighting a certain "bad guy" in the game, in order not to make the game too difficult or too easy).

V. Dynamically Measuring Properties of Objects

This section describes additional embodiments of the present invention. These embodiments relate to techniques for dynamically tracking and determining the impact of objects rendered and/or referenced by an application executing in a computer, without having to change and/or recompile the original application code.

For illustrative purposes, the invention is sometimes described in this Section V with reference to graphical objects. However, the invention is not limited to graphics and covers any type of media used in an application, such as sound, video, etc.

A. Overview

As described above, while an application is running on a computer device, it is possible to identify when a specific object is rendered or otherwise referenced, and execute a business rule associated with the object. For example, in the case where the object is a graphic texture, the associated business rule might replace the original texture with a new texture, or play an audio file. Where the invention is used in the in-game advertising field, the new texture or audio file might be associated with an advertisement. In this example, which is provided for purposes of illustration and not limitation, the invention enables the dynamic insertion of advertising content into a computer game, without requiring changes in the computer game itself.

This section V describes embodiments of the invention for dynamically tracking and determining the impact of objects rendered and/or referenced by an application as the application executes in a computer, without requiring changes in the original application source code. For example, for a given object of interest, embodiments of the invention track the object as the application executes, and measure properties such as those listed below. (The below is not an exhaustive list. Other object properties will be apparent to persons skilled in the relevant art(s).)

a. Object size on screen.
b. Object orientation: The angle of the display of the object in relation to the viewer.
c. Collisions with other objects: Whether the object collides with another object.
d. Collusion/hiding or partial hiding relation between objects (including transparency).
e. Determination if an object is in view or partially in view (as a result of clipping of a scene).
f. Distance from viewport/camera.
g. Distance between objects.
h. Object display time.

Measuring such object properties is useful for many applications. Consider computer games, wherein the display is dynamic and changes according to the behavior of the game and the decisions made by the user. Accordingly, with in-game advertising, the location and size of advertisements vary over time. As such, there is a need to measure, for example, the actual display of each advertisement according to the total time it was seen, the number of times it was seen more than N seconds, its display size, the angle in which it was viewed, whether or not it was hidden behind another non-transparent object, etc. Also, in embodiments, there is a need to calculate the "rating" of individual objects inside the game. Such ratings are useful in many respects, including but not limited to using rating information when developing/planning advertising campaigns. Tracking and measuring such object properties is useful for calculating advertising royalty fees for the in-game advertising field, as well as other fields.

Another example includes computer game tournaments. Because the invention tracks and measures object properties, including how objects interact, the invention makes it possible to run a computer game tournament, where such tournament is not an original element of the computer game.

Consider an example where the tournament is a race, and a particular tree is designated as the finish line. By tracking the object(s) corresponding to the tree, the invention makes it possible to determine which user reaches the tree first. As a result, the invention makes it possible to add tournament play to existing computer games, without having to modify the source code of the games.

Another example includes centralized information sources and applications on top of them. Because the invention tracks and measures object properties, the invention makes it possible to know which users have achieved certain things in the game. For example, what users in a MMORPG (massively multiplayer online role playing game) posses a certain weapon. By tracking the object(s) corresponding to the weapon and reporting it back to a centralized server or other designated location(s) and/or component(s), the information can be made available to other users/applications as well, allowing the creation of real-time virtual asset trading.

Figure 12A:
FIGS. 12A and 12B illustrate an object tagging component and an object measurement component useful for dynamically tracking and determining the impact of objects rendered and/or referenced by an application, without having to change and recompile the original application code, according to an embodiment of the invention.
Figure 12B:
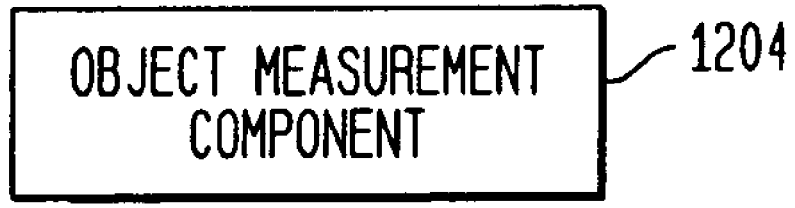

Embodiments of the invention include an optional object tagging component 1202 shown in FIG. 12A, and an object measurement component 1204 shown in FIG. 12B. In an embodiment, the object tagging component 1202 is part of the staging environment 102 (FIG. 2), and may be a stand alone component, or may be part of another component, such as indexing component 206. Also, object tagging component 1202 is optional, as one may not want necessarily to pre-designate objects to be measured, but may want to instead provide rules or criteria that objects must satisfy (e.g., "all objects larger than 5% of the screen") to be measured. Object measurement component 1204 is part of run-time environment 106, and may be a stand alone component, or may be part of another component, such as interception component 212 or business logic 214.

As described in detail below, object tagging component 1202 operates to tag certain objects, such as but not limited to certain objects that are indexed in staging environment information database 104. Object measurement component 1204 tracks and measures attributes of those tagged objects. Such operation shall now be described in greater detail with reference to a flowchart 1302 shown in FIG. 13. According to an embodiment, in flowchart 1302, steps 1304 and 1305 are performed in staging environment 102, and steps 1306, 1308 and 1310 are performed in run-time environment 106.

In step 1304, object tagging component 1202 identifies objects of interest. In an embodiment, such objects of interest are a subset of the objects indexed in staging environment information database 104. (In other embodiments, there may be objects of interest that are not indexed in staging environment information database 104. In still other embodiments, the staging environment information database 104 includes rules providing criteria that objects must satisfy in order to be considered objects of interest, without identifying individual objects) An "object of interest" is, for example, a graphical, audio or video object corresponding to an advertisement, or a graphical, audio or video object corresponding to a tournament, or any other object that one wishes to track and monitor, for whatever reason.

In step 1305, object tagging component 1202 tags the objects of interest. Such tagging of an object may be achieved in a number of ways, such as: (1) setting a flag in the object's entry in the staging environment information database 104; and/or (2) creating a new table, such as a new hash table, and storing in the table information identifying the object (such as a CRC of the object).

In an embodiment, object tagging component 1202 performs steps 1304 and 1305 augmenting/as-part-of interception component 204 and indexing component 206 as they are populating staging environment information database 104. Specifically, at the time that indexing component 206 identifies objects associated with function calls to low-level graphics/audio functions 208 (that were intercepted by interception component 204), and indexes such objects in staging environment information database 104, object tagging component 1202 also performs step 1304 (where it identifies objects of interest), and step 1305 (where it tags objects of interest).

Alternatively, object tagging component 1202 performs steps 1304 and 1305 after interception component 204 and indexing component 206 have populated staging environment information database 104 (specifically, after flowchart 600 in FIG. 6 has been performed). This can be used to allow batch logging of such objects during the execution of the applications in run-time environment 106, while steps 1304, 1305 are performed by an administrator without interacting with the application itself, but rather by altering information in database 104.

Steps 1304 and 1305 (that is, the operation of the object tagging component 1202) are further described below in Section V.B.

In step 1306, the object measurement component 1204 operating in the run-time environment 106 tracks objects of interest, to thereby monitor objects of interest as the scenes rendered by the application evolve and change. In particular, the object measurement component 1204 reviews the objects referenced in function calls directed to low-level graphics/audio functions 216 (such function calls having been intercepted by interception component 212, as described above), and determines whether any of those objects are objects of interest (i.e., by checking the staging environment information database 104, or by checking for information in the objects themselves, etc.). In an embodiment, once an object is initially identified as being an object of interest, subsequent tracking of that object in run-time environment 106 can be achieved by (1) inserting information into the object itself, indicating that the object is an object of interest; or (2) creating a proxy of the object, whereby future references to the object are directed to the proxy, instead of the object itself (the proxy would include a pointer or other reference to the underlying object, as well as information indicating that the object is an object of interest); or by other methods that will be apparent to persons skilled in the relevant art(s).

In step 1308, object measurement component 1204 determines the impact of the objects of interest. In embodiments, object measurement component 1204 performs step 1308 by determining, measuring and/or collecting information about the objects, such as the object size, orientation, collisions with other objects, whether the object is in view, distance of the object from other objects and from the camera, etc.

In step 1309, object impact information from step 1308 is saved in persistent storage.

In step 1310, which is optional, object measurement component 1204 transfers this object impact information to a server or other designated location(s), for further processing. In an embodiment, step 1310 is performed directly after step 1308, such that the object impact information is transferred in real-time. Alternatively, step 1310 is performed in batch mode, wherein object impact information is collected for some time period and then transferred to the server.

Steps 1306, 1308 and 1310 (that is, the operation of the object measurement component 1204) are further described below in Section V.C.

In an alternative embodiment, instead of (or in addition to) tracking pre-identified objects, object measurement component tracks and measures objects that satisfy pre-determined rules and/or criteria, where such rules and/or criteria may be stored in staging environment information database 104. In this embodiment, and as mentioned above, an administrator inserts into staging environment information database 104 such rules and/or criteria. Thereafter, in run-time environment 106, object measurement component determines whether objects referenced in intercepted function calls satisfy the rules and/or criteria. If the rules and/or criteria are satisfied, then object measurement component tracks and measures such objects, as the application 210 executes in run-time environment 106. This alternative embodiment is also further described below in Section V.C.

B. Operation of Object Tagging Component

Flowchart 1402 in FIG. 14 represents the operation of object tagging component 1202 as it identifies objects of interest, and as it tags such objects of interest. In other words, flowchart 1402 shows in greater detail the operation of object tagging component 1202 as it performs steps 1304 and 1305 of FIG. 13.

Flowchart 1402 essentially describes the processing steps carried out by object tagging component 1202 with respect to the handling of a single graphics or audio function call generated by a single software application. Persons skilled in the relevant art(s) will readily appreciate that a software application will likely generate numerous such function calls, and thus that the method of flowchart 1402 would likely be carried out numerous times during execution of the software application. The method will now be described in part with continued reference to certain software components illustrated in FIG. 2 and described above in reference to that figure. However, persons skilled in the relevant art(s) will appreciate that the method of flowchart 1402 is not limited to that implementation.

In step 1406, object tagging component 1202 reviews each object referenced in a function call directed to low-level graphics/audio functions 216. This function call was generated by application 202 in staging environment 102, and was intercepted by interception component 204, in the manner described above. Object tagging component 1202 determines whether the object satisfies tagging criteria.

The tagging criteria define some of the objects that will be tracked and measured. In an embodiment, the tagging criteria are pre-defined by users and, accordingly, the tagging criteria are implementation and application dependent. The tagging criteria may pertain to any object properties, and may pertain to a single property or a combination of properties. For example, the tagging criteria may specify the minimum size object that will be tracked, and/or may specify that only objects of certain shapes and/or colors will be tracked. Other tagging criteria will be apparent to persons skilled in the relevant art(s) based on the teachings contained herein.

If the object satisfies the tagging criteria, then in step 1408 the object tagging component 1202 tags the object. By "tagging the object," it is meant that the object is somehow marked or otherwise distinguished so that, in the future, the object can be identified as being an object of interest (i.e., as being an object that one wishes to track and measure). There are many ways of tagging the object. For example, object tagging component 1202 may set a flag or insert other tagging indicia into the object's entry in the staging environment information database 104 (see step 1410), or may create a new table, such as a new hash table, and insert information identifying the object (such as a CRC of the object) into the hash table (only tagged objects would be represented in this new table). Additionally, in embodiments, an opportunity may be provided to augment information on the object, such as providing a name or description of the object (see step 1412).

This can be done manually by an administrator, for example, and can be part of the process of FIG. 14, or can be performed off-line.

Returning to step 1406, if object tagging component 1202 determines that the object does not satisfy the tagging criteria, then step 1414 is optionally performed. Step 1414 is performed only in embodiments that allow manually tagging of objects by users. Accordingly, in step 1414, object tagging component 1202 enables the user to indicate whether or not the object should be tagged. Step 1414 can be performed as part of the process of FIG. 14, or can be performed off-line. If the user indicates that the object should be tagged, then step 1408 is performed, as described above.

The manual tagging of objects in step 1414 may be performed, for example, by allowing the user to interact with the application 202 in a certain way (e.g., by a certain key combination). Interception component 204 may intercept such user inputs. In an embodiment, the interception component 204 may intercept key strokes that allow the user to:

a. Navigate between all objects or a subset of the objects on the screen (e.g., objects that meet certain criteria). Objects that the user is currently "selecting" can be highlighted by intercepting calls for their rendering by interception component 204 and altering such rendering with additional information. For example, this is shown in the example of FIG. 19, by the white boundary boxes around the camel).

b. Choose/Tag a certain object.

c. (Optionally) Pop-up an interactive form for the user to allow entering additional data about the tagged object.

In certain embodiments, step 1414 is not performed, in which case flowchart 1402 is performed entirely automatically by object tagging component 1202. In other embodiments, tagging of objects is performed entirely manually. In still other embodiments, flowchart 1402 is performed automatically with some user interaction, in the manner described above. In still other embodiments, flowchart 1402 is not performed at all and rules are defined to provide criteria for objects to be measured, without identifying individual objects.

C. Operation of Object Measurement Component

Referring again to flowchart 1302 in FIG. 13, it was described above that steps 1306, 1308 and 1310 are performed by object measurement component 1204 in run-time environment 106. In an embodiment, such operation of object measurement component 1204 occurs during step 710 of flowchart 700 in FIG. 7. (The steps of flowchart 700 were described above, and that description is not repeated here.)

As described above, during step 710, business logic 214 applies business rule(s) that are applicable to the object being processed (referred to above as the "identified object"). In an embodiment, such business rules include "measurement business rules" that, when applied, cause the object measurement component 1204 to determine, measure and/or collect attribute information on the identified object. (As noted above, object measurement component 1204 may be a separate component in run-time environment 106, or may be part of business logic 214.) The operation of this embodiment is represented by flowchart 1502 in FIG. 15A. Flowchart 1502 includes steps 1501, 1503, 1504 and 1508, which collectively correspond to steps 1306, 1308 and 1310. Note that as it relates to measurement, in an embodiment, step 706 may take the form of a generic question, and not just an object identification criteria, for example—"does the object occupy X % of the screen?" Such generic criteria may be retrieved from business rules database 108 or other information sources, such as but not limited to staging environment information database 104.

In step 1501, interception component 212 intercepts a call to low-level graphics/audio functions 216, and in step 1503 an object referenced by such intercepted function call is identified, in the manner described above In step 1504, the object measurement component 1204 determines whether the identified object is tagged. As explained above, if the object is tagged, then the object is one that we wish to monitor its progress, and measure its attributes. The operation of object measurement component 1204 in step 1504 depends on how the object tagging component 1202 tagged the identified object in step 1408 (described above). For example, object measurement component 1204 may: (1) check for a flag in the identified object's entry in database 108 or 104; and/or (2) determine whether the identified object is represented in a hash table dedicated to tagged objects. The object measurement component 1204 may perform one or more of these checks.

In embodiments, once an object is identified as an object of interest as described above, we can mark it in the run-time environment 106, to facilitate keeping track of it, as it is being processed by multiple functions and libraries during a certain 3D scene buildup. This can be accomplished, for example, by inserting tagging indicia into the object itself. Alternatively, this can be accomplished by creating a proxy of the object (whereby future references to the object are directed to the proxy), and inserting tagging indicia into the proxy (the proxy would also include a pointer or other reference to the underlying object). Other techniques for tagging objects will be apparent to persons skilled in the relevant art(s).

If the identified object is tagged, then step 1508 is performed. In step 1508, the object measurement component 1204 performs one or more measurement business rules. Some of these measurement business rules may apply to all objects, or all tagged objects while others may be associated with only certain tagged objects. (Techniques for associating particular business rules with a given object are described above.) As a result of applying such measurement business rules, the object measurement component 1204 operates to determine the impact of the tagged object by, for example, determining, measuring and/or collecting attribute information on the identified object. Application of such measurement business rules may also cause the transfer of such object attribute information to the server or other designated location(s), in either real-time or batch mode, or a combination of real-time/batch mode. Further discussion of step 1508 is provided in Section V.D., below.

In an alternative embodiment, steps 1306, 1308 and 1310 are not performed during the performance of step 710. Instead, steps 1306, 1308 and 1310 are performed during a separate measurement algorithm process 1604.

This is shown in flowchart 1602 in FIG. 16. Flowchart 1602 is similar to flowchart 700 in FIG. 7, except in flowchart 1602 the measurement algorithm process 1604 has been added. Most of the steps of flowchart 1602 were described above during the description of FIG. 7, and that description is not repeated here. It is noted that, regarding the measurement embodiment being discussed, in some cases no business rules are applied in step 710. This may occur, for example, when information is being obtained on objects for the purpose of rating such objects. Measurement algorithm process 1604 includes steps 1606 and 1608, which collectively correspond to steps 1306, 1308 and 1310. Steps 1606 and 1608 shall now be described.

In step 1606, the object measurement component 1204 determines whether the identified object is one that should be measured. As explained above, if the object is an object of interest, then the object is one that the user wishes to monitor its progress, and measure its attributes. The operation of object measurement component 1204 in step 1606 depends on how the object tagging component 1202 tagged the identified object in step 1408 (described above).

If the identified object is tagged, then step 1608 is performed. In step 1608, the object measurement component 1204 determines the impact of the tagged object by, for example, determining, measuring and/or collecting attribute information on the tagged object. Also optionally during step 1608, object measurement component 1204 transfers such object attribute information to the server or other designated location(s), in either real-time or batch mode, or a combination of real-time/batch mode. Further discussion of step 1608 is provided in Section V.D., below.

FIG. 15B illustrates an alternative operational embodiment of object measurement component 1204. In this alternative embodiment, instead of (or in addition to) tracking pre-identified objects, object measurement component tracks and measures objects that satisfy pre-determined rules and/or criteria, where such rules and/or criteria may be stored in staging environment information database 104.

Specifically, in step 1552, interception component 212 intercepts a call to low-level graphics/audio functions 216, and in step 1554 an object referenced by such intercepted function call is identified, in the manner described above.

In step 1556, object measurement component 1204 determines whether the object satisfies certain pre-determined rules or criteria. Such rules and/or criteria are described elsewhere herein.

In step 1558, if the object satisfies the rules/criteria, then the object measurement component 1204 logs metrics about the object (i.e., determines the impact of the object). Such information is stored, and may be optionally transferred to a server or other designated component(s) in real-time or in batch mode.

D. Determining the Impact of a Tagged Object

In this section, steps 1508, 1608 and 1558 are described in more detail.

In steps 1508, 1608 and 1558, object measurement component 1204 determines the impact of an object being tracked. In an embodiment, the operation of object measurement component 1204 in performing step 1508, 1608 or 1558 is represented by flowchart 1702 in FIG. 17.

Flowchart 1702 essentially describes the processing steps carried out by object measurement component 1204 with respect to processing an object of interest that was referenced in a graphics or audio function call generated by software application 210. Persons skilled in the relevant art(s) will readily appreciate that software application 210 will likely generate numerous such function calls. Also, each such function call may reference numerous objects. Thus, the method of flowchart 1702 would likely be carried out numerous times during execution of the software application 210. The method will now be described in part with continued reference to certain software components illustrated in FIG. 2 and described above in reference to that figure. However, persons skilled in the relevant art(s) will appreciate that the method of flowchart 1702 is not limited to that implementation.

In step 1706, object measurement component 1204 determines whether the object satisfies measurement criteria. As reflected by step 1706, in certain embodiments, the attributes of an object are measured only in frames wherein the tagged object satisfies measurement criteria. For example, it may not be interesting to measure a tagged object in those frames or scenes where its relative size is less than a minimum. The criteria comprise one or more object properties that must be satisfied by the object in a given frame in order for the object to be measured in that frame.

In an embodiment, the measurement criteria are pre-defined and, accordingly, the measurement criteria are implementation and application dependent. The measurement criteria may pertain to any object properties, and may pertain to a single property or a combination of properties. For example, the measurement criteria may be based on object size (for example, an object less than a certain size will not be measured), angle (for example, only objects within a minimal and maximal angle will be measured), collision/obfuscation with another object (for example, an object will not be measured if the collusion area is greater than a maximum), hiding or partial hiding by another object (for example, an object will not be measured if it is hidden by more than a maximum percentage), distance from camera (for example, an object will not be measured if the distance between the object and the viewport is greater than a maximum), distance between objects (for example, an object will not be measured if it is too close to another object), and/or object display time (for example, an object will not be measured until it appears in a certain number of consecutive frames). The above is not an exhaustive list. Other measurement criteria will be apparent to persons skilled in the relevant art(s) based on the teachings contained herein.

It is noted that step 1706 is optional. Some embodiments do not include step 1706, in which case attributes of objects of interest are always measured. Alternatively, all objects the application is trying to render may also be measured.

FIG. 18 illustrates the operation of object measurement component 1204 when performing step 1706, according to an embodiment of the invention. FIG. 18 is provided for purposes of illustration, and is not limiting. Other processes for implementing step 1706 will be apparent to persons skilled in the relevant art(s) based on the teachings contained herein.

The process in FIG. 18 includes a particular combination (by way of example) of measurement criterions that must be satisfied in order for the tagged object to be measured. Such measurement criterions are represented by steps 1804, 1806, 1808, 1810 and 1812, the substance of which will be apparent to persons skilled in the relevant art(s). If all of these criterions are satisfied, then in step 1814 the object measurement component 1204 determines that the measurement criteria is satisfied. Otherwise, in step 1816, the object measurement component 1204 determines that the measurement criteria are not satisfied.

In other embodiments, the measurement criteria are based on a different set of object attributes. Also, in other embodiments, satisfying a subset of the measurement criterions may be sufficient to enable the object measurement component 1204 to determine that the criteria is satisfied (step 1814).

Returning to FIG. 17, if the object measurement component 1204 determines in step 1706 that the tagged object satisfies the measurement criteria, then step 1708 is performed. In step 1708, object measurement component 1204 determines, measures and/or collects attribute information pertaining to the tagged object. Step 1708 is further described in Section V.E., below.

In step 1710, in an embodiment, object measurement component 1204 processes the object attribute information from step 1708. For example, consider the case where the size of the tagged object is measured, and it is of interest to know the number of times the size of the tagged object falls within a first size range, a second size range, a third size range, etc. Such information may be useful in the in-game advertising field, where advertising royalties are based on exposure of advertisements in scenes rendered by the computer game. In this example, object measurement component 1204 in step 1708 determines which size range the tagged object falls into for the current frame, and then increments the counter associated with that size range.

In embodiments, the object measurement component 1204 may perform similar range calculations with regard to the object's angle, the object's distance from camera, the distance between objects, the object's display time, as well as other object properties, as will be appreciated by persons skilled in the relevant art(s) based on the teachings contained herein.

In embodiments, step 1710 is not performed by object measurement component 1204 in run-time environment 106. Instead, step 1710 is performed at the server and/or other designated components remote to run-time environment. In other embodiments, processing of step 1710 is shared between object measurement component 1204 and the server and/or other designated components remote to run-time environment.

In step 1712, object measurement component 1204 transfers the object attribute information to the server and/or other designated components remote to run-time environment. As discussed, step 1712 may be performed in real-time or in batch. Object measure component 1204 may transfer the raw data from step 1708, or the processed data from step 1710, or a combination of the raw and processed data.

E. Measurement Examples

As described above, object measurement component 1204 in step 1708 determines, measures and/or collects attribute information pertaining to the tagged object. Embodiments for determining, measuring and/or collecting such attribute information are described in this section. These embodiments are provided for purposes of illustration, and not limitation. Other techniques for determining, measuring and/or collecting object attribute information will be apparent to persons skilled in the relevant art(s).

For illustrative purposes, the following description is made with reference to graphical objects. However, the invention is not limited to graphics and covers any type of media used in an application, such as sound, video, etc. Determining, measuring and/or collecting attribute information for other types of objects will be apparent to persons skilled in the relevant art(s).

Measurements may be performed between objects (for example, the distance between objects, or the collision between objects, or the collusion of one object by the other), or on the absolute value of an object (for example, the size or angle of an object, or the distance of the object from the viewport). As will be appreciated, such measurements may be made by making calls to low-level graphics/audio functions 216. Accordingly, the following describes, by way of example, how the tasks can be accomplished using DirectX. However, the invention is not limited to this example embodiment. Determining, measuring and/or collecting attribute information for objects using other than DirectX function calls will be apparent to persons skilled in the relevant art(s).

Other object attribute information may be obtained from the calls intercepted by interception component 212, or via the operating system. Determining object attribute information from these sources, as well as other sources, will be apparent to persons skilled in the relevant art(s).

Note that for all examples illustrated below for measurement, such measurement can occur on an every frame basis, or based on a periodical (e.g., every $10^{th}$ frame), to alleviate performance issues. Obviously, such periodical measurement has an impact on the granularity of exposure times reported.

1. Collision Between Objects

Interaction and collision between objects can be measured in many ways. There are more accurate and less accurate methods, with associated computation performance issues.

One method is to cross correlate over all polygons that are building the objects and determine if and what properties (x,y,z) are related to collisions between the object geometries. This approach requires substantial computational resources.

An alternative method involves bounding the objects within a simpler geometric body (such as a box), and performing a collision check on only the bounding boxes. In DirectX, bounding box calculation is a relatively straightforward process using the D3DXComputeBoundingBox API. The returned position vectors are used as data for the collision detection process. The bounding box collision detection process is simpler than when performed at the polygon or vertex level.

Another alternative approach is to project the 3D representation into 2D space using the DirectX D3DXVec3Project API, and then perform the collision detection process in the 2D world.

2. In-View Check

"In-view" check determines if an object is located within the viewport. In-view check is interesting because some applications render objects that are not visible from the viewport.

Similar to the collision check, the in-view check can be done in the 3D world or in the 2D world. The in-view check can be performed with regard to the frustum and/or the viewport. The in-view check returns outside, inside or intersection. Like the collision check, the 3D in-view check can be done using the bounding box approach, or by projecting the 3D representation into 2D space.

An example approach uses the DirectX ProcessVertices API and/or D3DXVec3Project API to project the vertices from 3D to 2D. Then, the projected vertices are examined to determine whether the object is inside or outside the viewport.

3. Distance

Distance can be calculated from cameras or between objects. Distance units are relative to the game, but can be normalized to enable comparisons between games.

Distance is calculated by measuring the length between the center of the object geometry and the camera position. Alternatively, distance is calculated between the centers of object geometries. In DirectX, this measurement can be performed using the sqrt function on the sum of $dx^2+dy^2+dz^2$.

A special case is where the tagged object is being reflected by a mirror or lake (or another reflecting body), and the real distance to the object is not the distance to the mirror. In such cases, there is a need to take into account the existence of a render target. If there is a render target for the tagged object, then the distance is calculated with regard to that render target.

4. Size

All elements that are displayed in the viewport have size. In an embodiment, an object's size is measured by projecting the 3D representation of the object into 2D space. Then, the 2D projected size within the viewport is calculated.

Alternatively, the bounding box approach can be used. Specifically, the object's size is measured by projecting the 3D bounding box, instead of the object itself. The 2D size calculations are then performed on the projected 2D bounding box. This approach is less accurate, but is also less computationally demanding.

Projection from 3D to 2D in DirectX can be done by using the ProcessVertices and D3DXVec3Project APIs.

After projecting the bounding box points from 3D to 2D, the bounding box of the projected 2D points is again calculated. Then, the area of this bounding box is calculated as the percentage from the total viewport size.

5. Collusion

In the 3D world, objects have a z axis value that can be covered or partially hidden by other objects.

In order to determine the displayed area of an object, there is a need to deduct those areas of the object that are being hidden by other non-transparent objects. In the case of objects that are partially transparent, the decision whether to deduct the covered area or not is based on the threshold levels of the transparency properties. Such properties include, but are not limited to: alpha channel value, blending function and drawing order.

In order to measure an object's covered area, all objects that might have a cover potential are identified. Next, the cover contribution of each of these objects is calculated.

An object has cover potential if (1) the object collides to some extent with the tagged object; (2) the object is closer to the viewpoint (camera) than the tagged object; and (3) the object is not transparent.

The covered area is measured by projecting both the object with cover potential and the tagged object from 3D to 2D. Then, the area that is common to both objects is calculated.

An alternative approach is to operate as just described, but with bounding boxes, instead of the actual object geometries. This approach is less accurate, but also less computationally demanding.

Another alternative approach is to use the z-buffer mechanism built into DirectX and the graphics card. When detecting an object of interest, one may check the z-buffer before and after applying the object. The differences in the z-buffer depth map provide us with the contour of the 2D application of the 3D object. That 2D application can be compared to the rendering of the object on a clean z-buffer, to determine if it is hidden by objects that were previously rendered, and to what extent. At the end of the scene creation, the z-buffer may be checked again, in reference to the area previously identified as corresponding to the 2D application of the object of interest. If any of those pixels in the end-of-scene depth map have changed from the object was rendered, it means that the object may have been further hidden by other objects.

6. Angle (Orientation)

In an embodiment, the angle between objects, or the angle between an object and the camera, is treated as the angle between the objects' normal vectors.

An example method of determining the angle in which the object is being displayed involves calculating the face normal of the bounding box using a cross product function (D3DXVec3Cross). Then, a dot product function (D3DXVec3 Dot, where the input is the three plane vertices) is executed between the camera look at vector and the bounding box normal.

The result of this operation is the angle between the camera look at vector and the bounding box normal. In an embodiment, the face normal is transformed with the world matrix using the DirectX D3DXVec3TransformNormal API before this angle is calculated.

7. Example Embodiment of Calculating Measurements in Real Time Using DirectX

This section describes an example embodiment for measuring exposure of an object using DirectX (also see, for example, the process in FIG. 20). This example is provided for purposes of illustration, and not limitation. The DirectX functions mentioned herein are well known and are described in numerous places, such as but not limited to http://msdn.microsoft.com.

In order to measure exposure, the following DirectX functions are hooked:

IDirect3DDevice9::DrawIndexedPrimitive
IDirect3DDevice9::DrawPrimitive

When the game calls those functions, the hooked functions are called instead. The hooked functions may eventually forward the calls to the original function (depending on the business rules).

In an embodiment, the following steps are performed for calculating measurements:

(1) First check if this texture is a texture of interest (by checking the database of tagged objects from the staging environment, or objects that satisfy certain criteria, as described above). An object that was marked of interest previously may contain that knowledge already in its private data, to be retrieved by using GetPrivateData.

The private data may have been set when identifying the texture when it is loaded. There are additional ways to mark an object, and private data is used only as an example.

(2) If the texture is not of interest, continue without any additional processing.

(3) Verify that the texture has geometry data. Geometry data helps calculate measurements and should be created at least one time for the texture lifetime. Once calculated it can be save. In one example it can be saved in the texture private data.

(4) If the texture private data does not hold the geometry data, calculate the following and store it in the private data:
  a. Bounding Box: A bounding box is calculated by calling D3DXComputeBoundingBox. The function will return two 3D points that specify the location of the object
  b. Face Normal: call D3DXVec3Cross in order to determine the cross-product of the two 3D vectors
  c. Vertex Shader Version: check the version of Vertex Shader used if any by calling pIDirect3DDevice→GetVertexShader
  d. 2D or 3D: verify if the object is 2D or 3D by checking if the bounding box volume.
  e. In other examples, additional information can be calculated and calculations can be done in other ways.

(5) Once all the above information is available, calculate the actual exposure of a texture:
  f. Call pIDirect3DDevice→ProcessVertices: Create 2D projection of the 3D geometry shape
  g. Compute bounding box on 2D using D3DXComputeBoundingBox
  h. Call pIDirect3DDevice→GetViewport to get the screen resolution and check area of 2D bounding box inside Viewport. Take into account only the portion of the object 2D bounding box inside the viewport. As a result, calculate the size of the object that is visible in the screen.
  i. Using pIDirect3DDevice→GetTransform in order to get the object orientation and world orientation in order to calculate the object angle.

The information collected above can be calculated per texture per frame and is used by the measurements logic in order to calculate the total exposure of textures inside an application.

VI. Example Computer System Implementation

Figure 11:
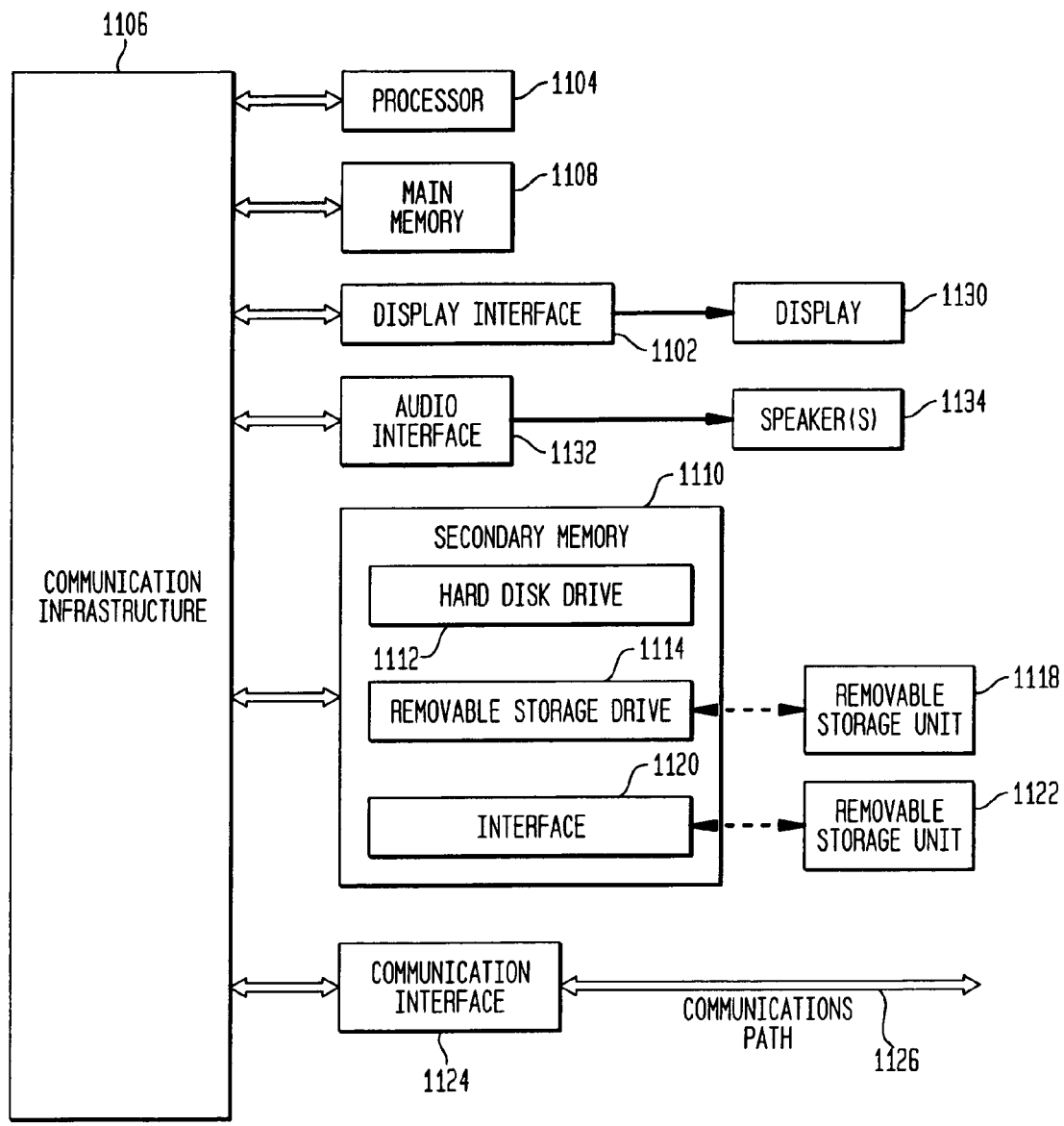
FIG. 11 depicts an example computer system that may be utilized to implement a computing device in accordance with an implementation of the present invention.

FIG. 11 depicts an example computer system 1100 that may be utilized to implement either staging environment 102 or run-time environment 106. However, the following description of computer system 1100 is provided by way of example only and is not intended to be limiting. Rather, as noted elsewhere herein, staging environment 102 and run-time environment 106 may each comprise a server, a console, a personal digital assistant (PDA), or any other computing device that is capable of executing software applications and displaying associated application-generated graphics and audio information to an end-user.

As shown in FIG. 11, example computer system 1100 includes a processor 1104 for executing software routines. Although a single processor is shown for the sake of clarity, computer system 1100 may also comprise a multi-processor system. Processor 1104 is connected to a communication infrastructure 1106 for communication with other components of computer system 1100. Communication infrastructure 1106 may comprise, for example, a communications bus, cross-bar, or network.

Computer system 1100 further includes a main memory 1108, such as a random access memory (RAM), and a secondary memory 1110. Secondary memory 1110 may include, for example, a hard disk drive 1112 and/or a removable storage drive 1114, which may comprise a floppy disk drive, a magnetic tape drive, an optical disk drive, or the like. Removable storage drive 1114 reads from and/or writes to a removable storage unit 1118 in a well known manner. Removable storage unit 1118 may comprise a floppy disk, magnetic tape, optical disk, or the like, which is read by and written to by removable storage drive 1114. As will be appreciated by persons skilled in the relevant art(s), removable storage unit 1118 includes a computer usable storage medium having stored therein computer software and/or data.

In an alternative implementation, secondary memory 1110 may include other similar means for allowing computer programs or other instructions to be loaded into computer system 1100. Such means can include, for example, a removable storage unit 1122 and an interface 1120. Examples of a removable storage unit 1122 and interface 1120 include a program cartridge and cartridge interface (such as that found in video game console devices), a removable memory chip (such as an EPROM or PROM) and associated socket, and other removable storage units 1122 and interfaces 1120 which allow software and data to be transferred from the removable storage unit 1122 to computer system 1100.

Computer system 1100 also includes at least one communication interface 1124. Communication interface 1124 allows software and data to be transferred between computer system 1100 and external devices via a communication path 1126. In particular, communication interface 1124 permits data to be transferred between computer system 1100 and a data communication network, such as a public data or private data communication network. Examples of communication interface 1124 can include a modem, a network interface (such as Ethernet card), a communication port, and the like. Software and data transferred via communication interface 1124 are in the form of signals which can be electronic, electromagnetic, optical or other signals capable of being received by communication interface 1124. These signals are provided to the communication interface via communication path 1126.

As shown in FIG. 11, computer system 1100 further includes a display interface 1102 which performs operations for rendering images to an associated display 1130 and an audio interface 1132 for performing operations for playing audio content via associated speaker(s) 1134.

As used herein, the term "computer program product" may refer, in part, to removable storage unit 1118, removable storage unit 1122, or a hard disk installed in hard disk drive 1112. A computer readable medium can include magnetic media, optical media, or other recordable media. These computer program products are means for providing software to computer system 1100.

Computer programs (also called computer control logic) are stored in main memory 1108 and/or secondary memory 1110. Computer programs can also be received via communication interface 1124. Such computer programs, when executed, enable the computer system 1100 to perform one or more features of the present invention as discussed herein. In particular, the computer programs, when executed, enable the processor 1104 to perform features of the present invention. Accordingly, such computer programs represent controllers of the computer system 1100.

Software for implementing the present invention may be stored in a computer program product and loaded into computer system 1100 using removable storage drive 1114, hard disk drive 1112, or interface 1120. Alternatively, the computer program product may be downloaded to computer system 1100 over communications path 1126. The software, when executed by the processor 1104, causes the processor 1104 to perform functions of the invention as described herein.

D. CONCLUSION

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method of determining the impact of objects referenced or rendered by an application executing on a computing device, comprising:
   (a) intercepting a function call to a graphics or audio application programming interface (API) issued by the application, wherein said interception is performed by an interception component installed on the computing device that is not part of the application or said graphics or audio API;
   (b) determining if an object referenced or rendered by said intercepted function call is an object to be tracked, wherein said determining is performed by an object measurement component installed on the computing device that is not part of the application or said graphics or audio API; and
   (c) collecting attribute information relating to display or playback of said object on the computing device if said object is determined to be an object to be tracked, wherein said collecting is performed by said object measurement component.

2. The method of claim 1, wherein step (b) comprises: determining whether said object is adhering to certain criteria or rules.

3. The method of claim 2, further comprising: accessing said certain criteria or rules.

4. The method of claim 1, wherein step (b) comprises:
   (i) determining whether said object is tagged.

5. The method of claim 4, wherein step (i) comprises: determining whether an entry in a database corresponding to said object comprises information that indicates that said object is to be tracked.

6. The method of claim 1, wherein step (c) comprises: at least one of determining and measuring said attribute information.

7. The method of claim 1, wherein said attribute information comprises one or more of object existence, object size, object orientation, collision with other objects, hiding or partial hiding between objects, whether an object is in view or partially in view, object distance from viewport, distance between objects, and object display time.

8. The method of claim 1, further comprising:
   (d) transferring said collected attribute information to a server.

9. The method of claim 1, further comprising:
   (d) processing said collected attribute information; and
   (e) transferring said processed collected attribute information to a server.

10. The method of claim 6, wherein step (c) further comprises:
    determining whether said object satisfies measurement criteria;
    wherein said determining and measuring step is performed for said object only if it is determined that said object satisfies said measurement criteria.

11. The method of claim 10, wherein said measurement criteria pertains to one or more object properties or attributes.

12. The method of claim 11, wherein said object properties or attributes include one or more of object existence, object size, object orientation, collision with other objects, hiding or partial hiding between objects, whether an object is in view or partially in view, object distance from viewport, distance between objects, and object display time.

13. The method of claim 1, wherein step (c) comprises:
    accessing one or more measurement business rules associated with said object; and
    processing said measurement business rules to collect said attribute information relating to said display or playback of said object on the computing device.

14. A computer program product comprising a computer readable medium having computer program logic recorded thereon for enabling a computing device to determine the impact of objects referenced or rendered by an instantiation of an application executing in said computing device, said computer program logic comprising:
    first means for enabling said computing device to intercept a function call to a graphics or audio application programming interface (API) issued by said application instantiation;
    second means for enabling said computing device to determine if an object referenced or rendered by said intercepted function call is an object to be tracked; and
    third means for enabling said computing device to collect attribute information relating to display or playback of said object on said computing device if said object is determined to be an object to be tracked;
    wherein said first means, said second means and said third means do not comprise a part of said application instantiation or said graphics or audio API.

15. The computer program product of claim 14, wherein said second means comprises:

means for enabling said computing device to determine whether said object is adhering to certain criteria or rules.

16. The computer program product of claim 15, wherein said second means further comprises:
means for enabling said computing device to access said certain criteria or rules.

17. The computer program product of claim 14, wherein said second means comprises:
determining means for enabling said computing device to determine whether said object is tagged.

18. The computer program product of claim 17, wherein said determining means comprises:
means for enabling said computing device to determine whether an entry in a database corresponding to said object comprises information that indicates that said object is to be tracked.

19. The computer program product of claim 14, wherein said third means comprises:
determine/measure means for enabling said computing device to determine and/or measure said attribute information.

20. The computer program product of claim 14, wherein said attribute information comprises one or more of object existence, object size, object orientation, collision with other objects, hiding or partial hiding between objects, whether an object is in view or partially in view, object distance from viewport, distance between objects, and object display time.

21. The computer program product of claim 14, wherein said computer program logic further comprises:
means for enabling said computing device to transfer said collected attribute information to a server.

22. The computer program product of claim 14, wherein said computer program logic further comprises:
means for enabling said computing device to process said collected attribute information; and
means for enabling said computing device to transfer said processed collected attribute information to a server.

23. The computer program product of claim 19, wherein said third means further comprises:
means for enabling said computing device to determine whether said object satisfies measurement criteria;
wherein said determine/measure means operates only if it is determined that said object satisfies said measurement criteria.

24. The computer program product of claim 23, wherein said measurement criteria pertains to one or more object properties or attributes.

25. The computer program product of claim 24, wherein said object properties or attributes include one or more of object existence, object size, object orientation, collision with other objects, hiding or partial hiding between objects, whether an object is in view or partially in view, object distance from viewport, distance between objects, and object display time.

26. The computer program product of claim 14, wherein said third means comprises:
means for enabling said computing device to access one or more measurement business rules associated with said object; and
means for enabling said computing device to process said measurement business rules to collect said attribute information relating to said display or playback of said object on said computing device.

27. A system, comprising:
a staging environment comprising a first computing device configured to execute a first instantiation of an application and an object tagging component said object tagging component comprising:
means for intercepting function calls issued to a graphics or audio application programming interface (API) by said first instantiation of said application,
means for tagging objects referenced by said intercepted function calls as objects to be tracked, and
means for outputting said tagged object to a database; and
a run-time environment comprising a second computing device configured to execute a second instantiation of said application and an object measurement component configured to track objects referenced by said second instantiation of said application if said objects referenced by said second instantiation of said application match tagged objects stored in said database.

28. The system of claim 27, wherein said means for tagging objects referenced by said intercepted function calls as objects to be tracked comprises:
means for determining if a particular object referenced by an intercepted function call satisfies tagging criteria; and
means for tagging said particular object as an object to be tracked responsive to a determination that said particular object satisfies said tagging criteria.

29. The system of claim 27, wherein said object measurement component comprises:
means for intercepting a function call issued to a graphics or audio API by said second instantiation of said application;
means for determining if an object referenced by said intercepted function call matches a tagged object in said database; and
means for collecting attribute information relating to display or playback of said object on said second computing device responsive to a determination that said object matches a tagged object in said database.

30. The system of claim 29, wherein said means for collecting attribute information comprises:
means for determining and/or measuring said attribute information.

31. The system of claim 30, wherein said attribute information comprises one or more of object existence, object size, object orientation, collision with other objects, hiding or partial hiding between objects, whether an object is in view or partially in view, object distance from viewport, distance between objects, and object display time.

32. The system of claim 29, wherein said object measurement component further comprises:
means for transferring said collected attribute information to a server.

33. The system of claim 29, wherein said object measurement component further comprises:
means for processing said collected attribute information; and
means for transferring said processed collected attribute information to a server.

34. The system of claim 27, wherein said means for tagging objects referenced by said intercepted function calls as objects to be tracked comprises:
means for enabling manual tagging of an object referenced by an intercepted function call.

35. A method, comprising:
(1) intercepting a function call issued to a graphics or audio application programming interface (API) by an application executing in a computing device, wherein said interception is performed by an interception component installed on said computing device that is not part of said application or said graphics or audio API;

(2) determining if an object referenced by said intercepted function call satisfies criteria;

(3) tagging said object as an object to be tracked during execution of another instance of said application, responsive to a determination that said object satisfies said criteria; and (4) storing said tagged object in a database for access by said other instance of said application;

wherein steps (2), (3) and (4) are performed by an object tagging component installed on said computing device that is not part of said application or said graphics or audio API.

* * * * *

UNITED STATES PATENT AND TRADEMARK OFFICE
CERTIFICATE OF CORRECTION

PATENT NO. : 7,596,536 B2
APPLICATION NO. : 11/472454
DATED : September 29, 2009
INVENTOR(S) : Yoav Tzruya et al.

It is certified that error appears in the above-identified patent and that said Letters Patent is hereby corrected as shown below:

In column 13, line 57, delete "210," and insert -- 210. --, therefor.

In column 32, line 1, in Claim 27, delete "component" and insert -- component, --, therefor.

In column 33, line 6, in Claim 35, delete "application," and insert -- application --, therefor.

Signed and Sealed this

Twelfth Day of January, 2010

David J. Kappos
*Director of the United States Patent and Trademark Office*